(12) United States Patent
Walton et al.

(10) Patent No.: US 12,429,884 B2
(45) Date of Patent: Sep. 30, 2025

(54) TAG LAYOUT FOR INDUSTRIAL VEHICLE OPERATION

(71) Applicant: Crown Equipment Corporation, New Bremen, OH (US)

(72) Inventors: Daniel D. Walton, Marysville, OH (US); Nicholas J. Sherman, Minster, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 18/762,171

(22) Filed: Jul. 2, 2024

(65) Prior Publication Data

US 2024/0353845 A1 Oct. 24, 2024

Related U.S. Application Data

(60) Division of application No. 18/338,032, filed on Jun. 20, 2023, now Pat. No. 12,093,056, which is a
(Continued)

(51) Int. Cl.
*G05D 1/646* (2024.01)
*B66F 9/06* (2006.01)
(Continued)

(52) U.S. Cl.
CPC ............ *G05D 1/028* (2013.01); *B66F 9/063* (2013.01); *E04H 5/02* (2013.01); *G01C 21/3811* (2020.08);
(Continued)

(58) Field of Classification Search
CPC ...... G05D 1/028; G05D 1/0088; G05D 1/021; G05D 1/0212; G05D 1/0223;
(Continued)

(56) References Cited

U.S. PATENT DOCUMENTS 3,922,678 A 11/1975 Frenkel
4,336,449 A 6/1982 Perry
(Continued)

FOREIGN PATENT DOCUMENTS

CN 1871782 A 11/2006
CN 101051362 A 10/2007
(Continued)

OTHER PUBLICATIONS

Second Office Action pertaining to Chinese Patent Application No. 201680036092.6 dated Apr. 2, 2020.
(Continued)

*Primary Examiner* — Daniel M. Robert
(74) *Attorney, Agent, or Firm* — Dinsmore & Shohl LLP

(57) ABSTRACT

According to one embodiment of the present disclosure, an industrial facility is provided comprising a tag layout and at least one ingress/egress zone. The tag layout comprises at least one double row of tags. The ingress/egress zone is located outside of an area of the vehicle travel plane occupied by the aisle path and is bounded in its entirety by the double row of tags, by two or more double rows of tags, by a combination of one or more double rows of tags and one more selected facility boundaries, or by combinations thereof. The double row of tags is arranged in an n×m matrix that is configured for successive detection of the inner and outer rows of tags that is dependent on the point-of-origin of a sensor transit path across the double row of tags. Additional embodiments are disclosed and claimed.

13 Claims, 14 Drawing Sheets

Related U.S. Application Data division of application No. 16/817,868, filed on Mar. 13, 2020, now Pat. No. 11,726,496, which is a continuation of application No. 15/148,605, filed on May 6, 2016, now abandoned.

(60) Provisional application No. 62/157,860, filed on May 6, 2015, provisional application No. 62/157,863, filed on May 6, 2015.

(51) Int. Cl.

| | |
|---|---|
| *E04H 5/02* | (2006.01) |
| *G01C 21/00* | (2006.01) |
| *G05D 1/00* | (2024.01) |
| *G05D 1/243* | (2024.01) |
| *G05D 1/247* | (2024.01) |
| *G05D 1/43* | (2024.01) |
| *G05D 1/65* | (2024.01) |
| *G05D 1/69* | (2024.01) |
| *G05D 1/81* | (2024.01) |
| *G06K 7/10* | (2006.01) |
| *G06K 17/00* | (2006.01) |
| *G06Q 10/00* | (2023.01) |
| *G06Q 10/087* | (2023.01) |

(52) U.S. Cl.
CPC .......... *G05D 1/0088* (2013.01); *G05D 1/021* (2013.01); *G05D 1/0212* (2013.01); *G05D 1/0223* (2013.01); *G05D 1/0261* (2013.01); *G05D 1/0291* (2013.01); *G05D 1/243* (2024.01); *G05D 1/247* (2024.01); *G05D 1/43* (2024.01); *G05D 1/646* (2024.01); *G05D 1/65* (2024.01); *G05D 1/69* (2024.01); *G05D 1/81* (2024.01); *G06K 7/10366* (2013.01); *G06Q 10/00* (2013.01); *G06K 17/0029* (2013.01); *G06Q 10/087* (2013.01)

(58) Field of Classification Search
CPC .... G05D 1/0261; G05D 1/0291; G05D 1/243; G05D 1/247; G05D 1/43; G05D 1/646; G05D 1/65; G05D 1/69; G05D 1/81; B66F 9/063; B66F 9/0755; B66F 9/07504; E04H 5/02; G01C 21/3811; G01C 21/00; G06K 7/10366; G06K 17/0029; G06K 7/0095; G06Q 10/00; G06Q 10/087
See application file for complete search history.

(56) References Cited

U.S. PATENT DOCUMENTS

| | | | |
|---|---|---|---|
| 4,847,773 | A | 7/1989 | Van Helsdingen et al. |
| 5,258,911 | A | 11/1993 | Wellman et al. |
| 5,343,145 | A | 8/1994 | Wellman et al. |
| 5,686,902 | A | 11/1997 | Reis et al. |
| 5,774,876 | A | 6/1998 | Woolley et al. |
| 5,804,810 | A | 9/1998 | Woolley et al. |
| 5,959,568 | A | 9/1999 | Woolley |
| 5,995,001 | A * | 11/1999 | Wellman .............. B66F 17/003 340/685 |
| 6,009,357 | A | 12/1999 | Wellman et al. |
| 6,040,774 | A | 3/2000 | Schepps |
| 6,049,745 | A | 4/2000 | Douglas et al. |
| 6,089,453 | A | 7/2000 | Kayser et al. |
| 6,135,694 | A | 10/2000 | Trego et al. |
| RE37,215 | E | 6/2001 | Dammeyer et al. |
| 6,366,242 | B1 | 4/2002 | Boyd et al. |
| 6,377,888 | B1 | 4/2002 | Olch |
| 6,459,966 | B2 | 10/2002 | Nakano et al. |
| 6,496,806 | B1 | 12/2002 | Horwitz et al. |
| 6,724,308 | B2 | 4/2004 | Nicholson |
| 6,799,099 | B2 | 9/2004 | Zeitler et al. |
| 6,900,762 | B2 | 5/2005 | Andrews et al. |
| 6,963,301 | B2 | 11/2005 | Schantz et al. |
| 6,988,667 | B2 | 1/2006 | Stewart et al. |
| 7,017,689 | B2 | 3/2006 | Gilliland et al. |
| 7,038,573 | B2 | 5/2006 | Bann |
| 7,151,445 | B2 | 12/2006 | Medve et al. |
| 7,151,979 | B2 | 12/2006 | Andersen et al. |
| 7,307,595 | B2 | 12/2007 | Schantz et al. |
| 7,439,864 | B2 | 10/2008 | Hunt et al. |
| 7,568,547 | B2 | 8/2009 | Yamada et al. |
| 7,605,688 | B1 | 10/2009 | Seah |
| 7,609,175 | B2 | 10/2009 | Porte et al. |
| 7,681,963 | B2 | 3/2010 | Sherman et al. |
| 7,688,223 | B2 | 3/2010 | Magens et al. |
| 7,734,385 | B2 | 6/2010 | Yang et al. |
| 7,755,552 | B2 | 7/2010 | Schantz et al. |
| 7,761,210 | B2 | 7/2010 | Baginski et al. |
| 7,800,548 | B2 | 9/2010 | Baginski et al. |
| 7,818,088 | B2 | 10/2010 | Andersen et al. |
| 7,844,505 | B1 | 11/2010 | Arneson et al. |
| 7,925,514 | B2 | 4/2011 | Williams et al. |
| 7,928,922 | B2 | 4/2011 | King |
| 8,031,086 | B2 | 10/2011 | Thacher et al. |
| 8,107,446 | B2 | 1/2012 | Shoarinejad |
| 8,131,422 | B2 | 3/2012 | Jensen et al. |
| 8,170,739 | B2 | 5/2012 | Lee |
| 8,184,005 | B2 | 5/2012 | Kamel |
| 8,193,903 | B2 | 6/2012 | Kraimer et al. |
| 8,195,342 | B2 | 6/2012 | Anderson |
| 8,237,563 | B2 | 8/2012 | Schantz et al. |
| 8,253,626 | B2 | 8/2012 | Schantz et al. |
| 8,255,107 | B2 | 8/2012 | Yang et al. |
| 8,295,974 | B2 | 10/2012 | Andersen et al. |
| 8,326,451 | B2 | 12/2012 | Schantz et al. |
| 8,421,674 | B2 | 4/2013 | Riesner |
| 8,457,781 | B2 | 6/2013 | Bailey et al. |
| 8,538,692 | B2 | 9/2013 | Wurman et al. |
| 8,587,455 | B2 | 11/2013 | Porte et al. |
| 8,643,538 | B2 | 2/2014 | Schantz et al. |
| 8,648,709 | B2 | 2/2014 | Gauger et al. |
| 8,718,860 | B2 | 5/2014 | Waltz et al. |
| 8,989,922 | B2 | 3/2015 | Jones et al. |
| 9,658,622 | B2 | 5/2017 | Walton et al. |
| 9,818,003 | B2 | 11/2017 | Steinbrunner et al. |
| 2003/0216969 | A1 | 11/2003 | Bauer et al. |
| 2005/0015187 | A1 | 1/2005 | Peteri |
| 2005/0052281 | A1 * | 3/2005 | Bann ............... G06K 7/10079 340/539.2 |
| 2005/0065861 | A1 | 3/2005 | Bann |
| 2005/0110610 | A1 | 5/2005 | Bazakos et al. |
| 2005/0173525 | A1 | 8/2005 | Polarine et al. |
| 2006/0220876 | A1 | 10/2006 | Campero et al. |
| 2006/0271274 | A1 | 11/2006 | Saarikivi |
| 2007/0007080 | A1 | 1/2007 | Manthey et al. |
| 2007/0069907 | A1 * | 3/2007 | Magens ............... B66F 17/003 340/679 |
| 2007/0095915 | A1 | 5/2007 | Crooks |
| 2007/0112620 | A1 | 5/2007 | Johnson et al. |
| 2007/0152823 | A1 | 7/2007 | Hirahara et al. |
| 2007/0164109 | A1 | 7/2007 | Ridings et al. |
| 2007/0164863 | A1 | 7/2007 | Himberger et al. |
| 2007/0187496 | A1 | 8/2007 | Anderson et al. |
| 2007/0233304 | A1 | 10/2007 | Baginski et al. |
| 2008/0040005 | A1 * | 2/2008 | Breed ............... B60R 21/33 701/48 |
| 2008/0129445 | A1 | 6/2008 | Kraimer et al. |
| 2008/0157923 | A1 | 7/2008 | Coty et al. |
| 2008/0180223 | A1 | 7/2008 | Cato et al. |
| 2008/0231459 | A1 | 9/2008 | Corder |
| 2009/0212103 | A1 | 8/2009 | Li et al. |
| 2011/0128163 | A1 | 6/2011 | Gilleland et al. |
| 2011/0137489 | A1 | 6/2011 | Gilleland et al. |
| 2011/0254667 | A1 | 10/2011 | Popescu |
| 2012/0107077 | A1 | 5/2012 | Alveteg |
| 2014/0085090 | A1 | 3/2014 | Yeo |
| 2014/0210595 | A1 * | 7/2014 | Kanner ............... B61L 25/048 340/10.1 |

(56) References Cited

U.S. PATENT DOCUMENTS

| | | |
|---|---|---|
| 2014/0240088 A1 | 8/2014 | Robinette et al. |
| 2016/0117899 A1 | 4/2016 | Chevalier et al. |
| 2016/0300083 A1 | 10/2016 | Ren |
| 2016/0332848 A1 | 11/2016 | Wieschemann |
| 2021/0284448 A1* | 9/2021 | Lee .................. B66F 9/24 |

FOREIGN PATENT DOCUMENTS

| | | | |
|---|---|---|---|
| CN | 103679226 | A | 3/2014 |
| CN | 203699123 | U | 7/2014 |
| DE | 102008021395 | A1 | 10/2009 |
| EP | 956523 | B1 | 12/2001 |
| EP | 901056 | A1 | 1/2002 |
| EP | 1010046 | B1 | 6/2003 |
| EP | 1537439 | B1 | 10/2007 |
| EP | 2284636 | A2 | 2/2011 |
| EP | 2354877 | A1 | 8/2011 |
| EP | 1728757 | B1 | 9/2011 |
| EP | 2080731 | B1 | 2/2013 |
| EP | 2447203 | B1 | 4/2013 |
| FR | 2632744 | A1 | 6/1988 |
| FR | 2929934 | A1 | 10/2009 |
| GB | 2473957 | A | 3/2011 |
| JP | H1120951 | A | 1/1999 |
| JP | 2006215857 | A | 8/2006 |
| JP | 4471148 | B2 * | 6/2010 |
| JP | 4791481 | B2 | 10/2011 |
| KR | 100882897 | B1 | 2/2009 |
| KR | 100882898 | B1 | 2/2009 |
| KR | 101059054 | * | 8/2010 |
| WO | 9529456 | A1 | 11/1995 |
| WO | 2008034742 | A2 | 3/2008 |

OTHER PUBLICATIONS

Park et al., "Autonomous Navigation System for Mobile Robot Using Randomly Distibuted Passive RFID Tags", IEICE Trans. Fundamentals, 2010, vol. E93-A, No. 4, 711-719, The Institute of Electronics, Information and communication Engineers.

Mehmood et al., "Navigation and Interaction in Physical Spaces using RFID Enabled Spatial Sensing", SenSys'07, Nov. 6-9, 2007, Sydney, Australia.

Linde Material Handling, "Guidelines for Planning and Setting Up Very Narrow Aisle Warehouses", 3-42, Linde Material Handling GmbH.

Jungheinrich, "Determining the Right Lift Truck Navigation System for Your Very Narrow Aisle (VNA) Warehouse", 2013, Jungheinrich.

Invitation to Pay Additional Fees dated Jul. 13, 2016 pertaining to International Application No. PCT/US2016/031293.

Invitation to Pay Additional Fees dated Jul. 20, 2016 pertaining to International Application No. PCT/US2016/031186.

International Search Report and Written Opinion dated Jul. 12, 2016 pertaining to International Application No. PCT/US2016/031278.

International Search Report and Written Opinion dated Sep. 6, 2016 pertaining to International Application No. PCT/US2016/031293.

International Search Report and Written Opinion dated Jul. 14, 2016 pertaining to International Application No. PCT/US2016/031167.

International Search Report and Written Opinion dated Sep. 13, 2016 pertaining to International Application No. PCT/US2016/031186.

Ekambaram et al., "SLAC-RF: Simultaneous 3D Localization of Movile Reads and calibration of RFID Supertags", Department of Electrical Engineering and Computer Sciences, University of California at Berkeley, Aug. 18, 2012.

Bohn et al., "Super-Distributed RFID Tag Infrastructures", Ambient Intelligence, 2004, vol. 3295, 1-12, Springer Berlin Heidelberg.

Notice of Allowance dated Feb. 1, 2017, pertaining to U.S. Appl. No. 15/148,202, filed May 6, 2016, 29 pgs.

Office Action dated Jun. 29, 2017, pertaining to U.S. Appl. No. 15/148,634.

Office Action pertaining to U.S. Appl. No. 15/571,950, dated Jun. 12, 2018.

Office Action dated May 7, 2019, pertaining to Chinese Application No. 201680036092.6, 11 pgs.

Non-Final Office Action pertaining to U.S. Appl. No. 15/782,202 dated May 29, 2019.

Canadian Examiner's Report dated Oct. 1, 2019, pertaining to Application No. 2984796, filed May 6, 2016.

Examination Report dated Jul. 2, 2021 pertaining to Canadian Divisional Patent Application No. 3,050,397 filed May 6, 2016.

Examination Report dated Apr. 13, 2022 pertaining to Canadian Divisional Patent Application No. 3, 110,772 filed May 6, 2016.

Examination Report dated Mar. 17, 2022 pertaining to European Divisional Patent Application No. 21206081.8 filed May 6, 2016.

Examination Report dated Nov. 1, 2023 pertaining to Australian Divisional application No. 2022275421 filed May 6, 2016, pp. 1-3.

Examination Report dated Jul. 7, 2023 pertaining to European Divisional application No. 21206081.8 filed May 6, 2016, pp. 1-3.

Canadian Examination Report dated Mar. 24, 2025 issued in related Canadian Patent Application No. 3236071 filed Feb. 26, 2021, pp. 1-4.

* cited by examiner

TAG LAYOUT FOR INDUSTRIAL VEHICLE OPERATION

CROSS REFERENCE TO RELATED APPLICATIONS

This application is a divisional of U.S. patent application Ser. No. 18/338,032 filed Jun. 20, 2023 which is a divisional of U.S. patent application Ser. No. 16/817,868 filed Mar. 13, 2020 issued Aug. 15, 2023 as U.S. Pat. No. 11,726,496 B2 which is a continuation of U.S. patent application Ser. No. 15/148,605 filed May 6, 2016, which claims the benefit of U.S. Provisional Application Ser. Nos. 62/157,863, filed May 6, 2015, and 62/157,860, filed May 6, 2015.

BACKGROUND

The present disclosure relates to industrial vehicles and, more specifically, to industrial vehicle control, monitoring, or navigation utilizing radio frequency identification tags, or other similar tag reading technology.

BRIEF SUMMARY

According to one embodiment of the present disclosure, an industrial facility is provided comprising a vehicle travel plane, at least one aisle path, a plurality of storage elements, a tag layout, and at least one ingress/egress zone. The aisle path, tag layout, and ingress/egress zone are located on the vehicle travel plane. The storage elements are arranged along, and on opposite sides of, the aisle path. The tag layout comprises at least one double row of tags comprising an inner row of tags and an outer row of tags. The ingress/egress zone is located outside of an area of the vehicle travel plane occupied by the aisle path and is bounded in its entirety by the double row of tags, by two or more double rows of tags, by a combination of one or more double rows of tags and one or more selected facility boundaries, or by combinations thereof. The double row of tags is arranged in an n×m matrix of n tag rows and m tag columns, the matrix configured for successive detection of the inner and outer rows of tags that is dependent on the point-of-origin of a sensor transit path across the double row of tags. Individual tags of the outer row of tags are closer to points of entry into said ingress/egress zone than are individual tags of the inner row of tags. Individual tags of the inner row of tags are closer to points of exit from the ingress/egress zone than are individual tags of the outer row of tags.

According to another embodiment of the present disclosure, the ingress/egress zone may be located at least partially, or entirely, within an area of the vehicle travel plane occupied by an aisle path.

According to yet another embodiment of the present disclosure, an industrial facility is provided where the tag layout comprises at least one succession of individual tags spaced uniformly to define a tag spacing s' and the succession of individual tags is interrupted by at least one tag pair comprising a primary tag and a secondary tag. The primary tag and the secondary tag of each tag pair define a tag spacing s" and the tag spacing s' is greater than the tag spacing s".

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1A:
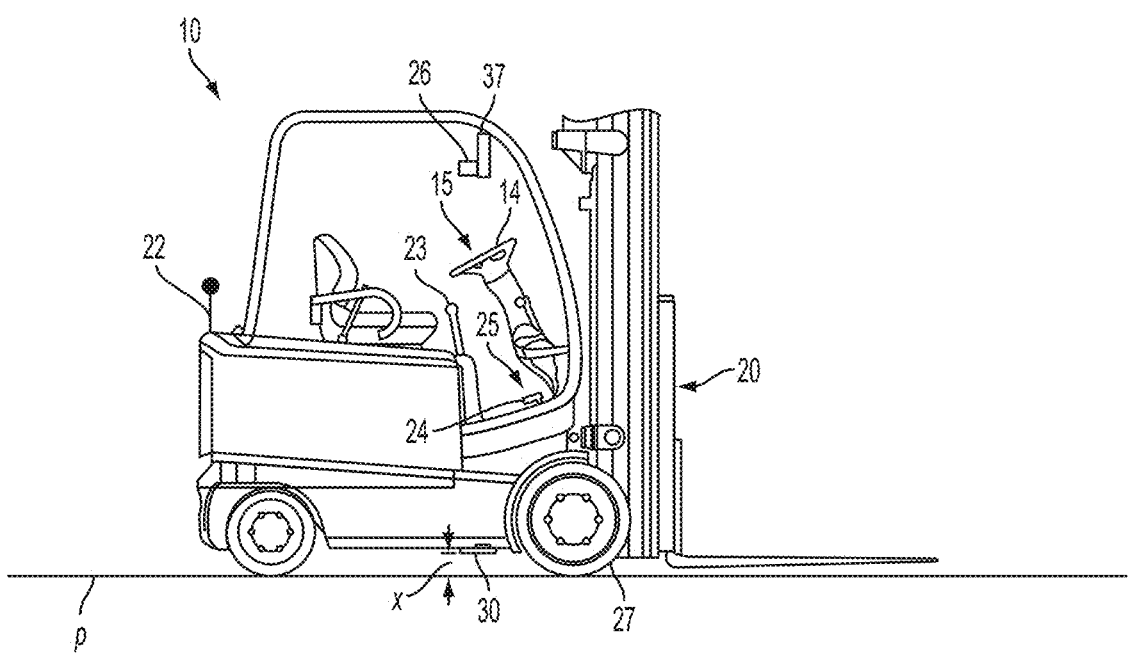
FIG. 1A illustrates an industrial vehicle according to one embodiment of the present disclosure.

FIG. 1A illustrates an industrial vehicle 10 in the form of a lift truck comprising conventional industrial vehicle hardware, e.g., a steering mechanism 15, storage and retrieval hardware 20, and a vehicle drive mechanism 25, the details of which are beyond the scope of the present disclosure and may be gleaned from conventional and yet-to-be developed teachings in the industrial vehicle literature—examples of which include U.S. Pat. Nos. 6,135,694, RE37215, 7,017,689, 7,681,963, 8,131,422, and 8,718,860, each of which is assigned to Crown Equipment Corporation.

Figure 1B:
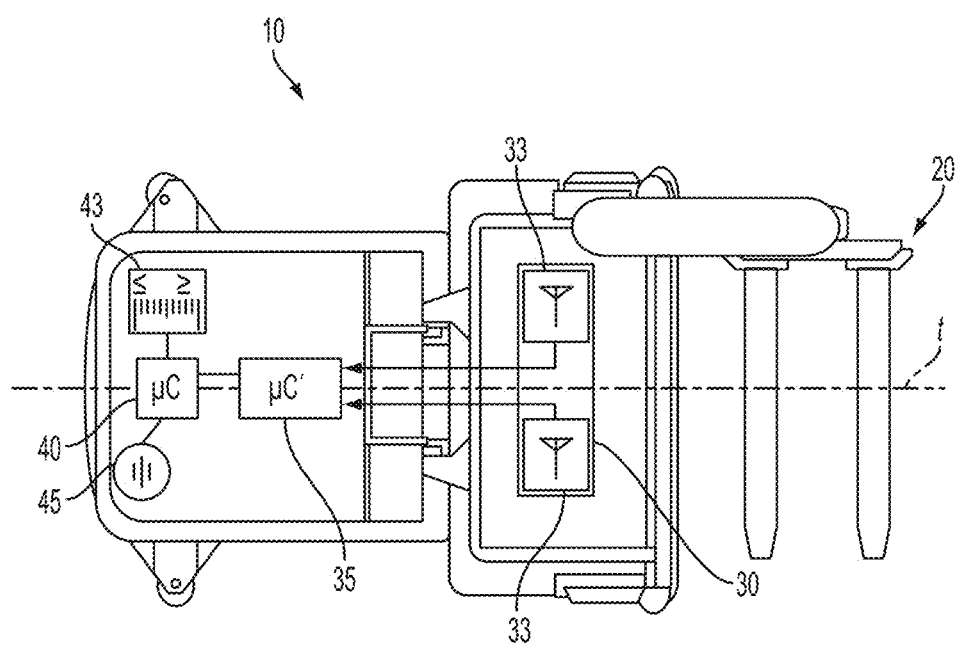
FIG. 1B is a schematic plan view of an industrial vehicle according to one embodiment of the present disclosure.

Referring further to FIG. 1B, which is a schematic plan view of an industrial vehicle 10 in the form of a lift truck. The industrial vehicle 10 further comprises a tag reader 30, a reader module 35, a user interface, and a vehicle controller 40. For example, and not by way of limitation, it is contemplated that the tag reader 30 will be responsive to radio frequency identification tags positioned in the vicinity of the industrial vehicle 10. It is contemplated that the radio frequency identification tag may be either an active radio frequency identification tag or a passive radio frequency identification tag. The particular configuration of the reader module 35, the tag reader 30, and the associated tags to which they are responsive are beyond the scope of the present disclosure and may be gleaned from conventional or yet-to-be developed teachings on the subject—examples of which include U.S. Pat. Nos. 8,193,903 B2, assigned to Crown Equipment Corporation, and entitled "Associating a transmitter and a receiver in a supplemental remote control system for materials handling vehicles" and U.S. Pat. No.

6,049,745, assigned to FMC Corporation, and entitled "Navigation System for Automatic Guided Vehicle."

Figure 2:
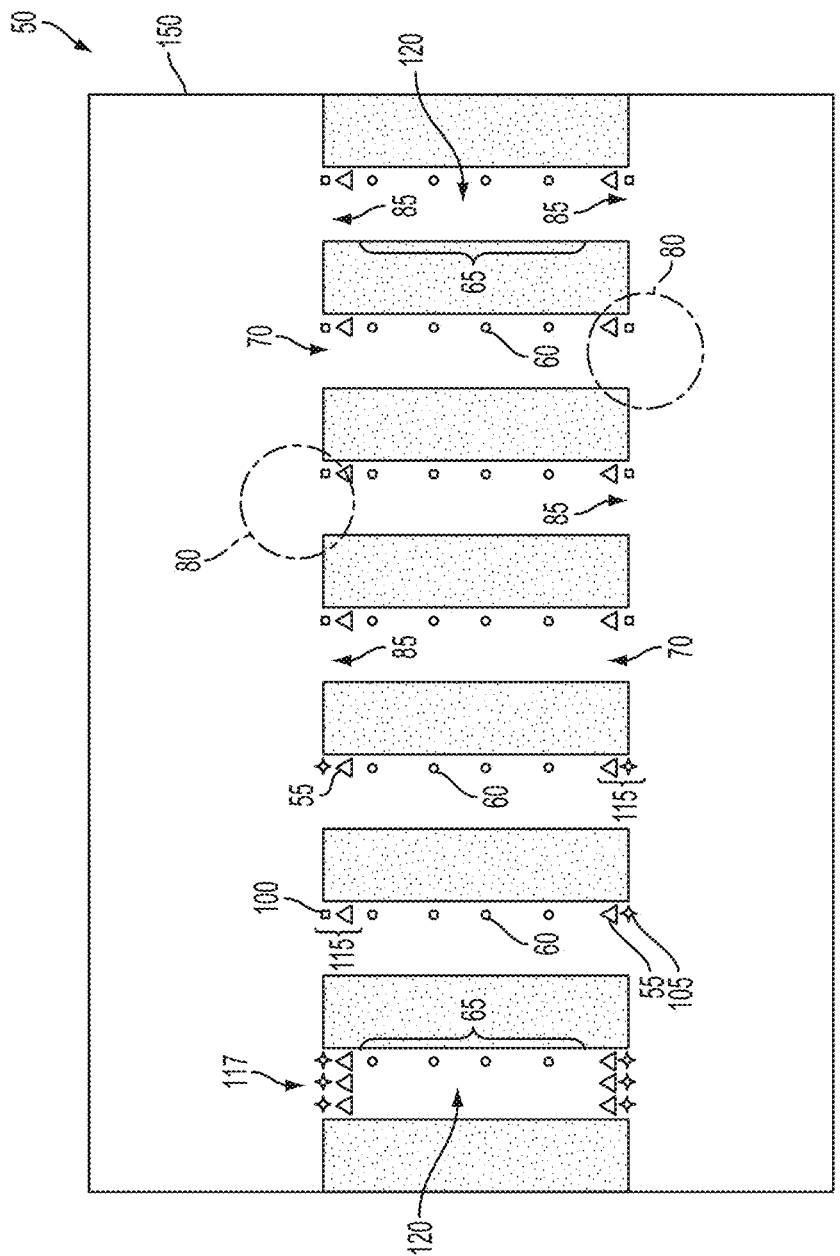
FIG. 2 is a plan view of a tag layout according to one embodiment of the present disclosure.
Figure 3:
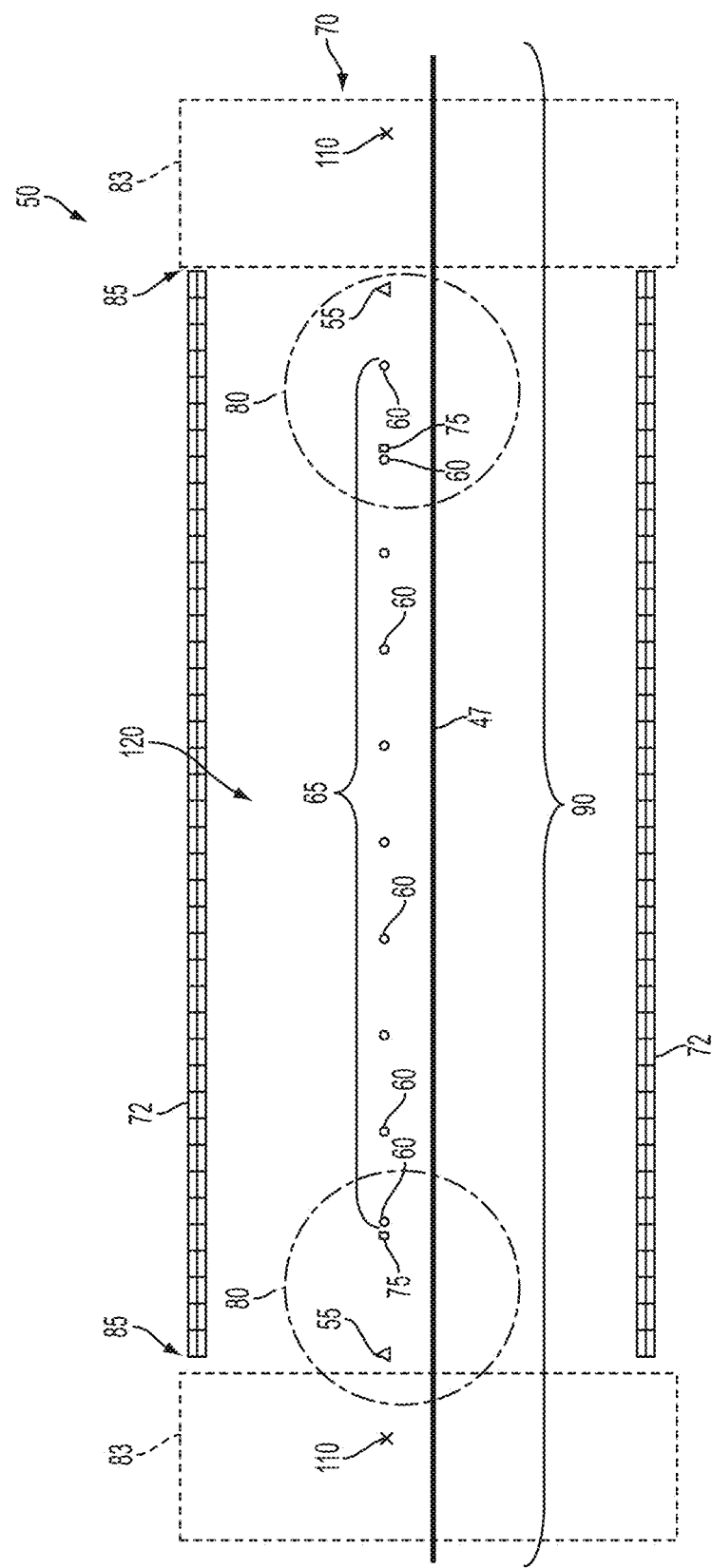
FIG. 3 is a plan view of a tag layout according to another embodiment of the present disclosure.

Referring to FIG. 2, a tag layout 50 can be constructed to comprise individual tags that are positioned such that an industrial vehicle 10 will operate under a defined set of vehicle functionality (e.g., vehicle function data) and/or tag-dependent position data that will endure until the industrial vehicle 10 identifies another individual tag of the tag layout 50 with a new correlation of vehicle functionality. In operation, the tag reader 30 and the reader module 35 of the industrial vehicle 10 cooperate to identify individual tags of a tag layout 50. Typically, the tag layout 50 will be positioned in a building 150 or other type of industrial facility. For example, and not by way of limitation, the building 150 may be a warehouse, a stock yard, or the like. The individual tags comprise a plurality of zone identification tags 55 and a plurality of zone tags 60. Each zone identification tag 55 occupies a position in the tag layout 50 that corresponds to a unique set of zone tags 65. Each unique set of zone tags 65 comprises a plurality of zone tags 60. The reader module 35 will discriminate between a plurality of zone identification tags 55 and a plurality of zone tags 60 identified in the tag layout 50. In operation, an industrial vehicle 10 may be traveling towards a zone identification tag 55. The reader module 35 will correlate an identified zone identification tag 55 with a unique set of zone tags 65. The reader module 35 will also correlate vehicle functionality with an identified zone tag 60 within the unique set of zone tags 65, tag-dependent positional data derived from the identified zone tag 60, or both. In one embodiment, each unique set of zone tags 65 comprises a plurality of zone tags 60 spaced along an aisle path 70 defined by one or more storage elements 72 (FIG. 3). In one embodiment, each unique set of zone tags 65 comprises a plurality of zone tags 60, one or more function tags 100, one or more aisle extension tags 110 (FIG. 3), one or more aisle entry tags 75 (FIG. 3), or combinations thereof. The function tags 100, aisle extension tags 110, aisle entry tags 75 are explained in greater detail hereinafter.

The vehicle controller 40 controls operational functions of the industrial vehicle hardware in response to (i) the correlation of vehicle functionality with an identified zone tag 60, tag-dependent positional data, or both, (ii) user input at the user interface of the industrial vehicle 10, or (iii) both. For example, where the industrial vehicle hardware comprises storage and retrieval hardware 20 and a vehicle drive mechanism 25, as shown in FIG. 1A, the vehicle functionality or the tag-dependent positional data correlated with the identified zone tag 60 may comprise a lift height of the storage and retrieval hardware 20, a traveling speed of the vehicle drive mechanism 25, or a combination thereof. Where the vehicle functionality pertains to the lift height of the storage and retrieval hardware 20, it may be presented in the form of a maximum lift height, a minimum lift height, a range of lift heights, etc. Similarly, where the vehicle functionality pertains to the traveling speed of the vehicle drive mechanism 25, it may be presented as a maximum speed, a minimum speed, a range of traveling speeds, etc.

Vehicle functionality may be combined to allow for efficient operation of the industrial vehicle 10. For example, but not limited to, vehicle functionality may include traveling speed restrictions dependent on the lift height of the storage and retrieval hardware 20, traveling speed restrictions dependent on the tag-dependent positional data, lift height restrictions dependent on the traveling speed of the vehicle drive mechanism 25, or lift height restrictions dependent on tag-dependent position data. It should be understood, that vehicle functionality discussed herein may be correlated with any individual tag of the tag layout 50 and are not limited to zone tags 60.

Those practicing the concepts of the present disclosure and familiar with industrial vehicle design and control will appreciate that the lift height of the storage and retrieval hardware 20 or the traveling speed of the vehicle drive mechanism 25 may be controlled in a variety of conventional or yet-to-be developed ways, the particulars of which are beyond the scope of the present disclosure—examples of which include U.S. Pat. Nos. 6,135,694, RE37215, 7,017,689, 7,681,963, 8,131,422, 8,718,860, each of which is assigned to Crown Equipment Corporation.

Referring to FIG. 3, which is an isolated view of a tag layout 50 in a single aisle path 70, the individual tags of the tag layout 50 may comprise a plurality of aisle entry tags 75 that are positioned along an aisle path 70 between vehicle entry or vehicle exit portions 80 of the aisle path 70. The reader module 35 will discriminate between the aisle entry tags 75 and the individual tags of the tag layout 50 along the aisle path 70 and correlate end-of-aisle vehicle functionality with an identified aisle entry tag 75. The vehicle controller 40 will control operational functions of the industrial vehicle hardware in response to the correlation of end-of-aisle vehicle functionality with an identified aisle entry tag 75. In this manner, a tag layout 50 can be constructed to comprise aisle entry tags 75 that are positioned within an aisle path 70 such that particular end-of-aisle vehicle functionality can be implemented as an industrial vehicle 10, traveling within an aisle path 70, approaches the vehicle entry or vehicle exit portion 80 of the aisle path 70. For example, and not by way of limitation, it might be preferable to ensure that an industrial vehicle 10 limits its traveling speed of the vehicle drive mechanism 25 and/or the height of the storage and retrieval hardware 20 as it approaches the vehicle entry or vehicle exit portion 80 of an aisle path 70. The traveling speed and/or height of the storage and retrieval hardware 20 may be varied as a function of tag-dependent positional data and an exit portion distance to the respective vehicle entry or vehicle exit portion 80. The exit portion distance is a quantity of length measured between a current position of the industrial vehicle and the end point 85 of respective aisle paths 70.

In one embodiment, the aisle entry tag 75 is identified and reported to an End-of-Aisle Control (EAC) system on the industrial vehicle 10. The EAC system may be a pre-existing system which provides end-of-aisle vehicle functionality based on other structures or devices in the building 150 (FIG. 2) such as a magnet or the like. It is contemplated that the aisle entry tag 75 is used as a replacement in the EAC system for the structure or device in the building 150.

It is contemplated that vehicle functionality may be dictated by a travel direction of the industrial vehicle. In one embodiment, vehicle functionality comprises vehicle functionality corresponding to a first correlation with an identified tag in the tag layout 50 based on a first travel direction and vehicle functionality corresponding to a second correlation with the same identified tag based on a second travel direction. The first travel direction is opposite the second travel direction. For example, and not by way of limitation, as the industrial vehicle enters an aisle path 70 (i.e., first travel direction) and identifies an aisle entry tag 75, the vehicle controller may implement a traveling speed of the vehicle drive mechanism 25 and/or the height of the storage and retrieval hardware 20 (i.e., first set of vehicle functionality). The vehicle controller may implement a different traveling speed of the vehicle drive mechanism 25 and/or the height of the storage and retrieval hardware 20 (i.e., second set of vehicle functionality) if the industrial vehicle reverses direction (i.e., second travel direction). It is contemplated that the industrial vehicle does not need to identify another tag of the tag layout 50 to implement the second set of vehicle functionality but simply reverse its travel direction. In other words, it is contemplated that the first set of vehicle functionality and the second set of vehicle functionality is correlated with one identified tag in the tag layout 50.

Alternatively, the reader module 35 may correlate an identified zone tag 60 with end-of-aisle vehicle functionality. In which case, the vehicle controller 40 would control operational functions of the industrial vehicle hardware in response to the correlation of end-of-aisle vehicle functionality with an identified zone tag 60. In this embodiment, a zone tag 60 may correspond to both vehicle functionality and end-of-aisle vehicle functionality negating the need for a separate and distinct aisle entry tag 75 in the aisle path 70. For example, and not by way of limitation, respective zone tags 60 of the unique set of zone tags 65 that are the furthest from the midpoint 120 of the aisle path 70 may comprise both vehicle functionality and end-of-aisle vehicle functionality.

Figure 4:
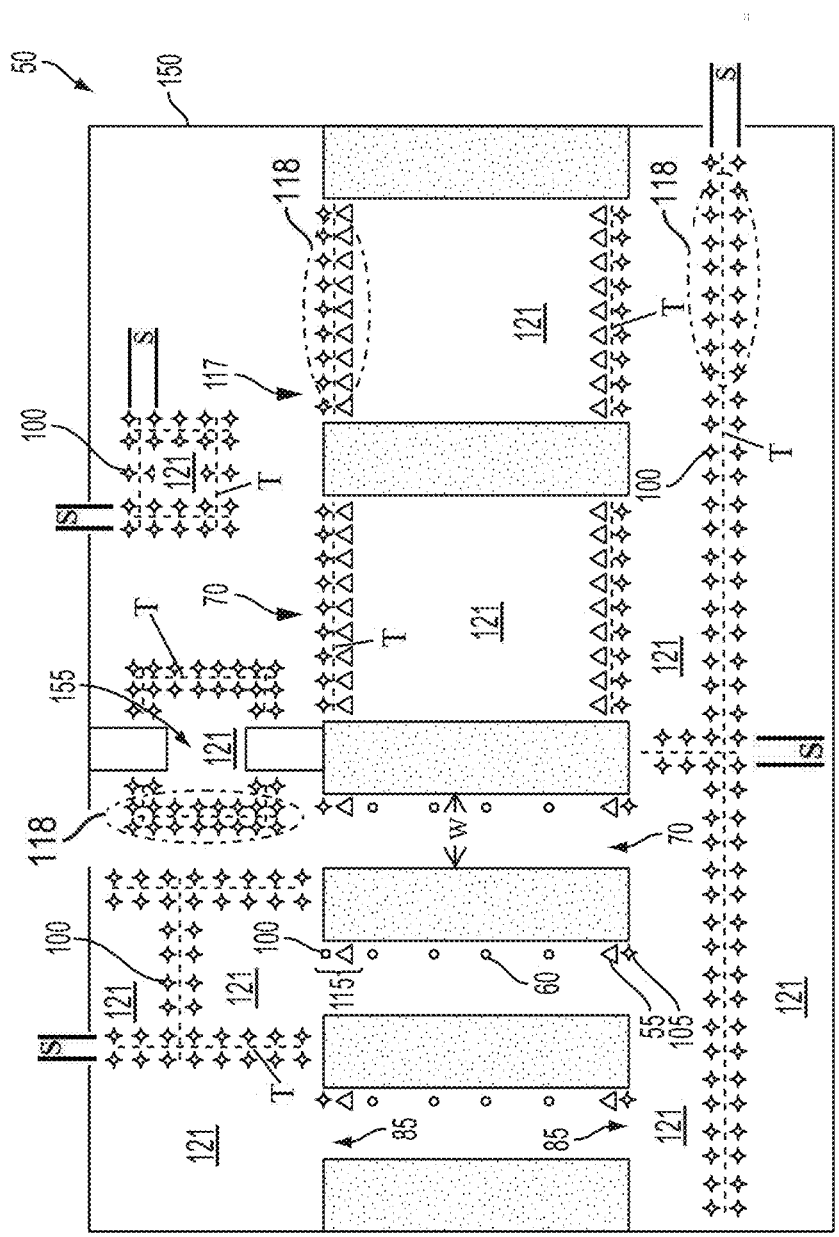
FIG. 4 is a plan view of a tag layout according to another embodiment of the present disclosure.

As is illustrated in FIG. 4, the individual tags of the tag layout 50 may comprise a plurality of function tags 100. For example, and not by way of limitation, function tags 100 may be positioned to bound a passageway 155 of the building 150. It should be understood that although FIG. 4 illustrates the plurality of function tags 100 positioned beyond the end points 85 of the aisle paths 70, the plurality of function tags 100 may be positioned anywhere in the tag layout 50, including positions between the end points 85 of an aisle path 70.

The reader module 35 will discriminate between function tags 100 identified in the tag layout 50. The reader module 35 will correlate vehicle functionality with an identified function tag 100. The vehicle controller 40 will control operational functions of the industrial vehicle hardware in response to the correlation of vehicle functionality with the identified function tag 100.

It is contemplated that in some instances, the reader module 35 will correlate at least partial negation of currently implemented vehicle functionality with an identified function tag 100. The vehicle controller 40 will control operational functions of the industrial vehicle hardware in response to the correlation of vehicle functionality with the identified function reset tag 100 function tag 100. For example, and not by way of limitation, when a function tag 100 is identified, some or all of the vehicle functionality placed on the industrial vehicle 10 in response to a previously identified tag of the tag layout 50 may be negated. In other words, the tags of the tag layout 50 may be staged such that, depending on vehicle travel direction, a set of vehicle functionality may be implemented for a particular area of the warehouse 150 and removed once the industrial vehicle departs from the particular area. An example of this functionality is provided below in regards to aisle function zones.

As illustrated in FIG. 3, respective aisle paths 70 may comprise respective aisle expansion areas 83 that are positioned beyond the respective end points 85. The individual tags of the tag layout 50 may also comprise a plurality of aisle extension tags 110. The plurality of aisle extension tags 110 may be positioned anywhere in the tag layout 50. In one embodiment, the plurality of aisle extension tags 110 may be positioned along the respective aisle path 70 in the aisle expansion area 83. The reader module 35 correlates vehicle functionality with an identified aisle extension tag 110, tag-dependent positional data derived from the identified aisle extension tag, or both. The vehicle controller 40 controls operational functions of the industrial vehicle hardware in response to the correlation of vehicle functionality with an identified aisle extension tag 110, with tag-dependent positional data, or both. For example, and not by way of limitation, vehicle functionality may be implemented in an aisle path 70 before a zone identification tag 55 is identified if an aisle extension tag 110 precedes the zone identification tag 55 along the aisle path 70. Furthermore, tag-dependent positional data may be derived along an aisle path 70 before a zone tag 60 is identified if an aisle extension tag 110 precedes the unique set of zone tags 65 along the aisle path 70. In another non-limiting example, the aisle extension tag 110 may comprise vehicle functionality like those of the plurality of function tags 100 (FIG. 4) such that vehicle functionality is either imposed or at least partially negated.

Referring back to FIG. 2, in one embodiment, the tag layout 50 may comprise one or more end-cap pairs 115 positioned at the end points 85 of the respective aisle paths 70. It is contemplated that the end points 85 may be positioned anywhere within the vehicle entry or vehicle exit portion 80 of the aisle path 70 but in many instances will occupy the same position in each aisle path 70. Respective end-cap pairs 115 may comprise an outer end-cap tag and an inner end-cap tag and each outer end-cap tag of an end-cap pair 115 is positioned farther from an aisle path midpoint 120 than a corresponding inner end-cap tag of the end-cap pair 115. The inner end-cap tag may be either a zone identification tag 55 or a zone tag 60. If, for example, a zone tag 60 is the inner end-cap tag, than that zone tag 60 is the outermost zone tag 60 of the plurality of zone tags in the aisle path 70. In other words, the outermost zone tag 60 is a zone tag 60 which is positioned farther from the aisle path midpoint 120 than corresponding zone tags from the plurality of zone tags 60. In one embodiment, the outer end-cap tag is an individual tag from the plurality of function tags 100 (FIG. 4).

The reader module 35 discriminates between the outer end-cap tag and the inner end-cap tag of the end-cap pair 115 and correlates an identified outer end-cap tag with exit-specific vehicle functionality and correlates an identified inner end-cap tag with entry-specific vehicle functionality. The vehicle controller 40 controls operational functions of the industrial vehicle hardware in response to entry-specific vehicle functionality as the industrial vehicle 10 enters an aisle path 70 and controls operational functions of the industrial vehicle hardware in response to exit-specific vehicle functionality as the industrial vehicle exits an aisle path 70. In one embodiment, the tag layout 50 may comprise one or more end-cap rows 117 which comprise a plurality of end-cap pairs 115. The one or more end-cap rows 117 are spaced across respective end points 85 of an aisle path 70 such that an industrial vehicle entering or exiting the aisle path 70 will identify the individual tags of the end-cap row 117 regardless of where the industrial vehicle 10 crosses the end-cap row 117 within the vehicle entry or vehicle exit portion 80 of the aisle path 70. One non-limiting example of one or more end-cap rows 117 is shown in FIG. 4 in the larger aisles paths on the right of the figure.

Figure 5:
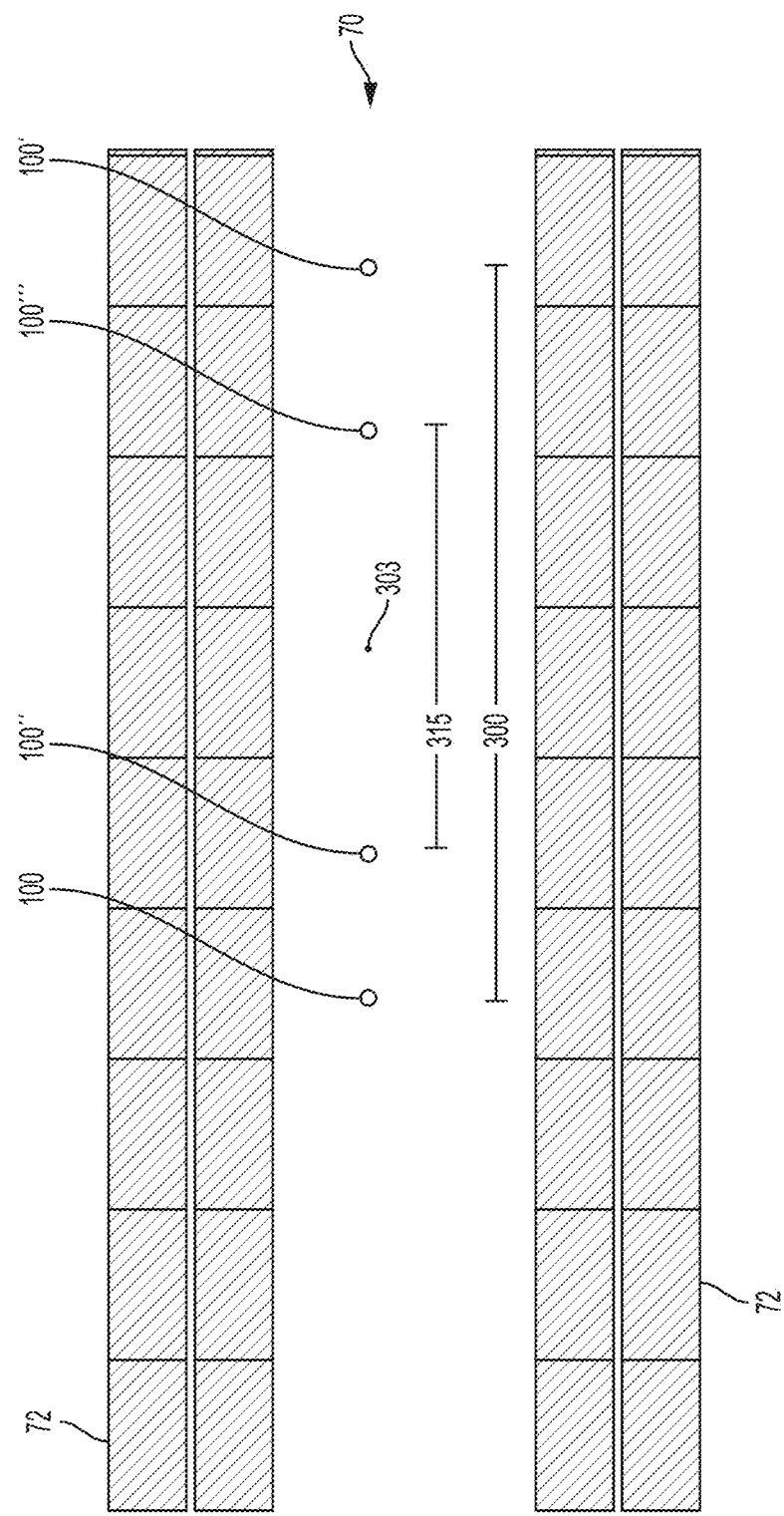
FIG. 5 is a plan view of a tag layout with aisle function zones according to one embodiment of the present disclosure.

FIG. 5 illustrates an aisle function zone 300. It is contemplated that the aisle path 70 may comprise one or more aisle function zones 300. A function tag 100 is positioned along the aisle path 70 on an opposite side of respective aisle function zones 300 from a second function tag 100'. In one embodiment, the function tag 100 and the function tag 100' are about equidistant from a midpoint 303 of the aisle function zone 300 along the aisle path 70. Regardless of travel direction of the industrial vehicle 10 along the aisle path 70, the vehicle functionality associated with the function tag 100 is correlated along the aisle path 70 before the function tag 100. In other words, vehicle functionality correlated to the function tag 100 and the function tag 100' may be switched depending on the industrial vehicle's travel direction along the aisle path 70 such that the vehicle controller controls the industrial vehicle hardware per the correlated vehicle functionality of the function tag 100 in the aisle function zone 300 and the does not control the industrial vehicle hardware per the correlated vehicle functionality of the function tag 100 outside of the aisle function zone 300.

It is contemplated that the aisle path 70 may comprise more than one aisle function zone. In one embodiment, a second aisle function zone 315 may be nested (i.e. positioned) within a first aisle function zone 300. A first function tag 100 and a second function tag 100' bound the first aisle function zone 300 and a third function tag 100" and a fourth function tag 100'" bound the second aisle function zone 315. The first function tag 100 corresponding to the first aisle function zone 300 may be farther from a midpoint 303 of the second aisle function zone 315 than the third function tag 100" corresponding to the second aisle function zone 315 such that the vehicle functionality associated with the first function tag 100 is correlated by the reader module before the third function tag 100". The second function tag 100' corresponding to the first aisle function zone 300 may be farther from the midpoint 303 of the second aisle function zone 315 than the fourth function tag 100'" corresponding to the second aisle function zone 315 such that the vehicle functionality associated with the fourth function tag 100'" is correlated by the reader module before the second function tag 100'.

It is contemplated that the nested aisle function zones may enable efficient operation of an industrial vehicle 10 along an aisle path 70 by staging vehicle functionality as needed. For example, and not by way of limitation, the vehicle functionality correlated with the first function tag 100 is a traveling speed of the vehicle drive mechanism 25 (FIG. 1A) dependent on the lift height of the storage and retrieval hardware 20 (FIG. 1A) and the vehicle functionality correlated with the third function tag 100" is lift height setting. In another non-limited example, the vehicle functionality correlated with the first function tag 100 is lift height setting dependent on the traveling speed of the vehicle drive mechanism 25 and the vehicle functionality correlated with the third function tag 100" is traveling speed setting. In one embodiment, the second function tag 100' negates the vehicle functionality placed on the industrial vehicle 10 by the first function tag 100 and the fourth function tag 100'" negates the vehicle functionality placed on the industrial vehicle 10 by the second function tag 100'.

In one embodiment, an aisle path 70 comprises a second aisle function zone 315 overlapping a first aisle function zone 300 such that a first function tag 100 is identified along the aisle path 70 before the third function tag 100" and the second function tag 100' is identified along the aisle path 70 before the fourth function tag 100'" or vice versa. In one embodiment, an aisle path 70 comprises a second aisle function zone 315 adjoining, i.e., end to end or butt against each other, a first aisle function zone 300 such that the first function tag 100 and the second function tag 100' are identified along the aisle path 70 just before the third function tag 100" and the fourth function tag 100'" or vice versa. As stated before, vehicle travel direction is independent of the order in which the function tags in the aisle function zone embodiments are correlated.

Figure 6:
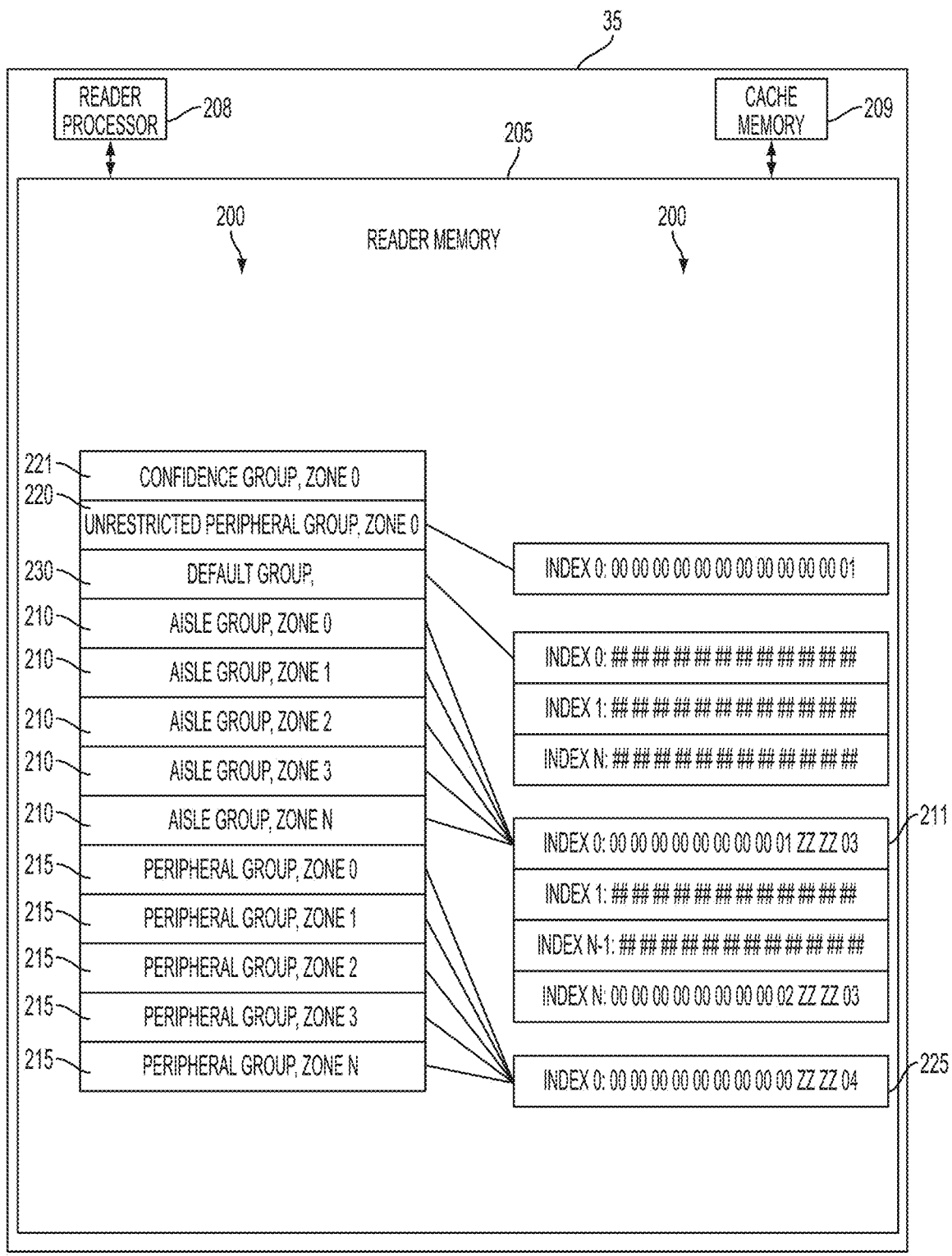
FIG. 6 is a schematic illustration of a reader module according to one embodiment of the present disclosure.

Referring now to FIG. 6, the reader module 35 comprises a reader memory 205 coupled to a reader processor 208. As described hereinabove, in reference to FIG. 1B, the tag reader 30 and the reader module 35 of the industrial vehicle 10 cooperate to identify individual tags of a tag layout 50. It is contemplated that the reader module 35 and the vehicle controller 40 may be separate components or integrated into a single unit and that the appended claims, which recite a reader module 35 and a vehicle controller 40 are not limited to either an integrated unit or separate components. It is also contemplated that all of the features of the reader module 35 may be integrated into the tag reader 30.

Each individual tag of the tag layout 50 (FIGS. 2-5) may correspond to a unique identification code. Each unique identification code corresponds to a memory location 200 in the reader memory 205 of the reader module 35. The memory location 200 comprises at least one of indexing data, operational data, and tag position data. The tag reader 30 and the reader module 35 cooperate to determine vehicle functionality by identifying an individual tag of the tag layout 50 and associating the identified tag with a memory location 200 to retrieve at least one of indexing data, operational data, and tag position data. It is contemplated that the function of an individual tag in the tag layout 50 may be changed by changing the indexing data and/or the operational data corresponding to that individual tag. For example, and not limited to, if an aisle path 70 is changed, a zone tag 60 may be changed to an aisle entry tag 75 by changing the memory location 200 corresponding to that zone tag 60. It should be understood that the tag layout 50 may not change physically, but may be changed operationally by making changes to the reader memory 205. For example, and not way of limitation, the changes to the memory location 200 may include changing the physical memory location 200 such that the identified tag of the tag layout 50 is correlated with a new memory location 200 or the at least one of indexing data, operational data, and tag position data is changed in the current memory location 200.

The operational data may comprise any data related to the operations of the industrial vehicle 10 which may include, but not limited to, at least one of: steering data, tag position data, tag heading data, forward speed data, reverse speed data, override forward speed data, override reverse speed data, height data, overhead height data, override height data, reset data, forward speed based on height data, reverse speed based on height data, height based on forward speed data, height based on reverse speed data, automatic hoist operation (refer to Automatic Positioning System discussed below) operator messages, aisle identification, audible alerts, and the like. Operator messages may include aisle identification, distance data along the aisle path 70 derived from tag-dependent positional data, warning messages, intersection information, override instructions, and the like. Audible alerts may include using the vehicle controller to sound the horn, activate a buzzer or beeper, activate warning lights, activate directional indicators, and the like. Vehicle functionality may be derived from the operational data. For example, and not limited to, operational data corresponding to an identified individual tag of the tag layout 50 may be forward speed data and reverse speed data. The reader module 35 may correlate operational data as vehicle functionality with the identified individual tag. Depending on a position and direction of travel of the industrial vehicle 10 along the aisle path 70, the vehicle controller may limit the forward speed, for example, as the end of the aisle is approached and not limit the reverse speed of the industrial vehicle 10. It should be understood that "forward" and "reverse" are terms used to describe opposite directions of travel of the industrial vehicle. Traveling in a "positive" and "negative" direction based on vehicle heading (i.e., derived from tag heading data) are suitable substitutes.

Each unique set of zone tags 65 (FIGS. 2 and 3) and associated zone identification tags 55 along an aisle path 70 may correspond to an aisle zone group 210 of unique identification codes in the reader memory 205. Each zone identification tag 55, corresponding to the unique set of zone tags 65 in the aisle path 70, corresponds to indexing data used to index the reader memory 205 to the one or more memory locations 200 (e.g., memory location 211) corresponding to the aisle zone group 210 of unique identification codes for that unique set of zone tags 65. It is contemplated that processing speed may be improved by ensuring that the unique identification codes corresponding to the unique set of zone tags 65 are stored in the reader memory 205 in order by their unique identification codes. However, it should be noted that the reader module may read the unique identification codes in either order or reverse order depending upon the direction of travel of the industrial vehicle 10 along the aisle path 70. The unique identification codes in each aisle zone group 210 may be in a known order according to the position of each zone tag 60 along the aisle path 70.

The reader module 35 may comprise cache memory 209 coupled to the reader memory 205. The aisle zone group 210 may be copied from the reader memory 205 into the cache memory 209 when an identified zone identification tag 55 indexes the reader memory 205 to a corresponding aisle zone group 210. The reader module 35 may correlate vehicle functionality with an identified zone tag 60 within the unique set of zone tags, with tag-dependent positional data derived from the identified zone tag 60, or both using the copy of the aisle zone group 210 in the cache memory 209 to reduce a correlation time. The correlation time is a quantity of time needed to correlate vehicle functionality, derive tag-dependent position, or both from an identified tag in the tag layout 50.

It is contemplated, either through the use of the reader memory 205 or a cache memory 209 data transfer to non-volatile memory, that the current correlation/implementation of vehicle functionality is saved in the event of an industrial vehicle 10 shutdown (e.g., turned off, power loss, etc.) such that the current correlation/implementation of vehicle functionality is resumed upon restart of the industrial vehicle 10. For example, and not by way of limitation, if the industrial vehicle 10 losses power, the vehicle functionality currently in use will be stored and used upon restart of the industrial vehicle such that the industrial vehicle 10 may resume operation where it lost power in the building 150 without the need to first identify an individual tag in the tag layout 50.

One or more function tags 100 (FIGS. 2 and 4) may correspond to a function zone group 215 of one or more unique identification codes in the reader memory 205. In one embodiment, respective function zone groups 215 comprise a single memory location 225 in the reader memory 205 and the individual tags corresponding to each function zone group 215 have the same unique identification code. In one embodiment, respective function zone groups 215 comprise one or more memory locations 200 in the reader memory 205 and the unique identification codes corresponding to the function zone group 215 are stored in the reader memory 205 in a known order for the grouping of tags. Further, one or more function tags 100 may correspond to a reset group 220 of unique identification codes in the reader memory 205. The reset group 220 of unique identification codes comprises a single memory location 225 in the reader memory 205 and the individual tags of the one or more function tags 100 in this group comprises the same unique identification code. It is contemplated that the reset group 220 comprises those function tags 100 within the tag layout 50 which correspond to at least partial negation of currently implemented vehicle functionality with an identified function tag 100. It is also contemplated that the unique identification codes corresponding to the function zone group 215 and the unique identification codes corresponding to the reset group 220 may be stored in the reader memory 205 in a known order for the grouping of tags to enhance processing speed if more than one identification code is used for the respective group.

One or more aisle extension tags 110 (FIG. 3) may correspond to a default group 230 of unique identification codes in the reader memory 205. It is also contemplated that the one or more aisle entry tags 75 may be configured to correspond to a default group 230 of unique identification codes in the reader memory 205. All of the unique identification codes in the default group 230, regardless of tag type (i.e., aisle extension tag 110, aisle entry tag 75, etc.) may be organized in one of the following ways to enhance processing speed: in a known order; in sequential order defined by the numerical unique identification code of each tag corresponding to the default group; by one or more aisle paths 70 (FIG. 2 or 3) such that the unique identification codes corresponding to each aisle path 70 in the default group 230 may be stored in the reader memory 205 in a known order. It is also contemplated that a known order of unique identification codes in the default group 230 may not have any numerical order and simply be placed in the default group 230 in an order which is known.

Still referring to FIG. 6, it is contemplated that the unique identification codes can be stored in the reader memory 205 in the following order: confidence group 221 first, a reset group 220 second, a default group 230 third, one or more aisle zone groups 210 fourth, and one or more function zone groups 215 fifth. It is contemplated that the order of the unique identification codes stored in reader memory 205 may change depending on the organization of the individual tags in the tag layout. For example, and not by way of limitation, the confidence group 221 may not be used and may either have an empty place holder in the reader memory 205 to maintain the memory structure shown in FIG. 6 or it may be removed from the reader memory 205. It is also contemplated that when the tag layout 50 changes, the memory locations 200 of the reader memory 205 are rewritten to accommodate the new tag layout. It is contemplated that processing speed may be enhanced by grouping the individual tags of the tag layout 50 in the reader memory 205. The grouping may eliminate the need to search the entire reader memory 205 for the unique identification code. The sequencing of the unique identification codes in the reader memory 205 further enhances the processing speed. For example, and not limited to, when an individual tag of the tag layout 50 is identified, the reader module 35 reads the reader memory 205 in the stored order until the unique identification code corresponding to the identified tag is read or identified. If, for example, and not by way of limitation, the reader module 35 is sequencing through an aisle zone group 210 of unique identification codes as zone tags are identified along an aisle path and a new tag is identified which does not correspond to the respective aisle zone group 210, the reader module 35 will jump to the default group 230 and again sequence through the stored order until the unique identification code corresponding to the newly identified tag is found.

In one embodiment, the reader module 35 may store vehicle functionality and/or tag dependent positional data in cache memory 209 for the current identified individual tag of the tag layout. The vehicle controller 40 (FIG. 1B) uses the data in the cache memory 209 to control the operational functions of the industrial vehicle hardware. When a new individual tag of the tag layout is identified, the data in cache memory 209 changes and the vehicle controller 40 may use the new data.

It is contemplated that an individual tag of the tag layout 50 is identified when the reader module 35 receives a signal from the individual tag and the industrial vehicle 10 travels beyond a read range of the tag reader 30 such that the signal is lost by the tag reader 30 (i.e., no longer read or within the read range). The reader module may then correlate the received signal to a unique identification code. A signal strength of the received signal is measured to identify when the tag reader 30 is positioned over the individual tag. Tag-dependent positional data in relation to signal strength may be used to identify the exact position of the industrial vehicle 10 in the tag layout 50. In one embodiment, when a plurality of individual tags of the tag layout 50 is within the read range of the tag reader 30, the tag reader 30 may receive multiple signals. In this embodiment, the reader module 35 increments a counter for each signal it receives from an individual tag. The counter is incremented until the tag reader 30 receives a signal from only one of the individual tags for a read count. In other words, the reader module monitors and counts the number of times a signal is received by the tag reader 30. The read count may be set to eliminate any erroneous signals received by the tag reader 30 from individual tags on the edge of the read range. In other words, it is contemplated that the tag reader 30 may receive a signal that exceeds the read count from an individual tag that is closest to the tag reader 30. In one embodiment, it is contemplated that the read count is four received signals. When the industrial vehicle 10 travels beyond the read range of the individual tag with the read count, the reader module 35 identifies that individual tag.

Referring to FIGS. 2-5, it is contemplated that the individual tags of the tag layout 50 comprise non-programmable tags and programmable tags. The unique identification codes corresponding to the programmable tags comprise one or more bit locations that are able to be changed. The one or more bit locations may comprise at least one of a multi-antenna bit, an index bit, and a side definition bit. The multi-antenna bit enables or disables one of the two read antennas 33 (FIG. 1B) on the industrial vehicle 10 (FIG. 1B). In one embodiment, when the industrial vehicle 10 is along an aisle path 70, it is contemplated that both read antennas 33 will be used to identify the individual tags of the tag layout 50 and when the industrial vehicle 10 is beyond the end points 85 (FIG. 2) of the aisle path 70, the industrial vehicle 10 will identify individual tags of the tag layout 50 using only one of the two read antennas 33. When a read antenna 33 is disabled, it should be understood that the reader module 35 may use only one (i.e., a primary read antenna) to identify individual tags of the tag layout 50 or the reader module 35 may receive signals from both read antennas 33 however it should be understood that the reader module 35 may use the signal from only one antenna 33 (i.e., the primary antenna) to identify the individual tags of the tag layout 50. In one embodiment, the plurality of aisle entry tags 75 are positioned on the same side of respective aisle paths 70 that correspond to the primary read antenna. It is contemplated that the aisle entry tags 70 along an aisle path 70 comprises the multi-antenna bit such that both antennas are used along the aisle path 70 and only one antenna is used beyond the end points 85 of the aisle path 70. This configuration of the tag layout 50 where the aisle entry tags 70 are on the same side of respective aisle paths 70 is to ensure that the aisle entry tags 70 are identified while the multi-antenna bit is disabled (i.e., primary read antenna only).

The index bit may be used to index the reader memory 205 directly to a specified memory location 200. For example, and not by limitation, a zone identification tag 55 may have the index bit set to index the reader memory 205 to a specific aisle zone group 210. In conjunction with the index bit, a zone identification tag 55 may include a side definition bit to indicate which end an industrial vehicle 10 is entering an aisle path 70 from. The side definition bit may index the reader memory 205 to either a beginning or an ending portion of the aisle zone group 210 of unique identification codes corresponding to which end of the aisle path 70 the industrial vehicle 10 enters. It is contemplated that the plurality of zone tags 60 comprise a start side and an end side. The side definition bit comprises a start side bit and an end side bit. The start side bit corresponds to the start side of the plurality of zone tags 60 and the end side bit corresponds to the end side of the plurality of zone tags 60. The side definition bit of the zone identification tag 55 corresponding to the start side of the plurality of zone tags 60 comprises the start side bit and the side definition bit of the zone identification tag 55 corresponding to the end side of the plurality of zone tags 60 comprises the end side bit. The reader module 35 identifies the start side bit and indexes the reader memory 205 to a beginning of the aisle zone group 210 of unique identification codes corresponding to the plurality of zone tags 60, and identifies the end side bit and index the reader memory 205 to an ending of the aisle zone group 210 of unique identification codes corresponding to the plurality of zone tags 60.

As discussed before, the unique identification codes can be stored in the reader memory 205 in the following order: confidence group 221 first, a reset group 220 second, a default group 230 third, one or more aisle zone groups 210 fourth, and one or more function zone groups 215 fifth. In one embodiment, the reader module 35 may sequence through the above reader memory 205 order to identify the memory location 200 corresponding to the unique identification code identified by the reader module 35. For example, and not by limitation, if a zone identification tag is identified, the reader module may read through the confidence group 221 first, the reset group 220 second, and the memory locations 200 associated with each zone identification tag last until the memory location 200 associated with the identified zone identification tag is found. It is contemplated that the reader module 35 will not read each memory location 200 associated with each aisle zone group 210 but only the start side zone identification tag and the end side zone identification tag. In one embodiment, the zone identification tags may be programmed tags which include the start side bit and the end side bit which is used by the reader module 35 to identify and read memory locations 200 associated with zone identification tags and to ignore memory locations 200 associated with the zone tags in the same aisle zone group 210.

It is contemplated that the tags of tag layout 50 are physically the same type of tag and the nomenclature used herein is to identify the use associated with each tag and its position in the tag layout 50. It is also contemplated that the one or more function tags 100, zone identification tags 55, aisle extension tags 110, and aisle entry tags 75 may be programmed tags which allow changes to be made to their unique identification code without requiring changes to the reader memory 205. In addition to the unique identification code comprising a multi-antenna bit, an index bit, and a side definition bit as explained hereinbefore, the unique identification code also comprises a group definition bit which, when identified, tells the reader module 35 which group (i.e., confidence group 221, reset group 220, default group 230, aisle zone group 210, or function zone group 215) the identified tag belongs to. By changing the group bit, the vehicle functionality may also be changed thereby allowing the functionality of the tag layout to change either by changing the data in the memory locations 200 in the reader memory 205 or by changing the unique identification code of selected programmed tags.

Referring to FIGS. 1A, 1B, and 3, the aisle path 70 may also comprise a wire-guided aisle path portion 90 between vehicle entry or vehicle exit portions 80 of the aisle path 70. The aisle path 70 may comprise one or more storage elements 72 that are parallel to a guide wire 47 and between the respective end points 85 of the aisle path 70. The storage and retrieval hardware 20 is configured to store and retrieve items from selected storage elements 72. The industrial vehicle 10 may comprise a wire guidance module 45 and the industrial vehicle hardware may comprise a steering mechanism 15 that is responsive to signals from the wire guidance module 45. The wire guidance module 45 is, in turn, responsive to an electrically conductive guide wire 47 positioned along the aisle path 70. For example, it is contemplated that steering commands may be automatically implemented in a wire-guided operational mode and manually implemented in the non-wire-guided operational mode—examples of which include U.S. Pat. Nos. 8,193,903 B2, assigned to Crown Equipment Corporation, and entitled "Associating a transmitter and a receiver in a supplemental remote control system for materials handling vehicles" and U.S. Pat. No. 6,049,745, assigned to FMC Corporation, and entitled "Navigation System for Automatic Guided Vehicle." Those practicing the concepts of the present disclosure and familiar with industrial vehicle design and control will also appreciate that the tracking of the guide wire 47 may be accomplished in a variety of conventional or yet-to-be developed ways, the particulars of which are beyond the scope of the present disclosure and are described in the above-noted references.

The industrial vehicle hardware may comprise a plurality of travel wheels 27 that define the vehicle travel plane p. The tag reader 30 may be fixed to the industrial vehicle 10 at a location that is at a distance x of less than about 30 cm above the industrial vehicle travel plane p as defined by the travel wheels 27. It is contemplated that the distance x is derived from a received signal strength of about-30 db. For example, and not by way of limitation, the tag reader 30 may be secured to the underside of the industrial vehicle 10.

Referring specifically to FIG. 1B, the industrial vehicle 10 has a longitudinal travel axis 1. In some embodiments, the tag reader 30 may comprise two read antennas 33 that are positioned on opposite sides of the longitudinal travel axis t in a common plane displaced from and parallel to the vehicle travel plane p (FIG. 1A). In this manner, where a particular tag layout 50 (FIG. 4 or FIG. 2) merely comprises individual tags along one side of an aisle path 70, one of the read antennas 33 will be positioned over the individual tags of the aisle path 70 regardless of the direction of travel of the industrial vehicle 10 along the aisle path 70. In this embodiment, a travel direction of the industrial vehicle in respective aisle paths may be derived by which of the two read antennas 33 is positioned over the individual tags of the aisle path 70. In one embodiment, the individual tags of the tag layout 50 are positioned along the same side in respective aisle paths 70. In one embodiment, the individual tags of the tag layout 50 are positioned along either side in respective aisle paths 70.

In one embodiment, the read antennas 33 define respective read ranges and generate respective tag read signals when individual tags of the tag layout enter the respective read ranges of the read antennas 33. The tag reader 30 and the reader module 35 further cooperate to generate a vehicle direction signal when the individual tags are identified primarily with reference to tag read signals from only one of the two read antennas 33. The vehicle controller 40 controls operational functions of the storage and retrieval hardware 20 partially as a function of the vehicle direction signal. It is contemplated that the respective read ranges of the read antennas 33 may overlap or be mutually exclusive. It is further contemplated that an individual tag may be read by read antennas 33 positioned on opposite sides of the longitudinal travel axis of the industrial vehicle 10, in which case the tag reader 30 and the reader module 35 would be equipped to discriminate between respective read signals from the two different antennas 33 and determine which read signal is valid, primarily with reference to the respective signal strengths of the two read signals.

In some embodiments, the industrial vehicle hardware may comprise a travel distance sensor 43 that is configured to measure a travel distance of the industrial vehicle. For example, and not by way of limitation, the travel distance sensor 43 may be an inertial sensors or odometry hardware, such as a load wheel sensor, a rotary encoder, a Hall Effect sensor, etc. The tag reader 30, the reader module 35, the travel distance sensor 43, and the vehicle controller 40 cooperate to derive tag-dependent positional data from identified zone tags 60 and travel distance data from the travel distance sensor 43. The tag reader 30, the reader module 35, the travel distance sensor 43, and the vehicle controller 40 cooperate to determine tag-dependent positional data by identifying a zone tag 60, correlating the identified zone tag 60 with tag position data, using the travel distance sensor 43 to calculate a travel distance from the identified zone tag 60, and determining tag-dependent positional data from the calculated travel distance and the tag position data correlating with the zone tag 60.

In another example, the tag reader 30, the reader module 35, the travel distance sensor 43, and the vehicle controller 40 cooperate to determine tag-dependent positional data by identifying a first zone tag in the unique set of zone tags 65 and zeroing a travel distance of the travel distance sensor 43 when the first zone tag is identified. The travel distance sensor 43 then calculates the travel distance from the first identified zone tag. The tag reader 30 and the reader module 35 cooperate to identify subsequent zone tags of the unique set of zone tags 65 and associating each subsequent identified zone tag with tag-dependent positional data. The travel distance calculation from the first identified zone tag is then corrected by using the tag position data associated with each subsequent identified zone tag. The reader module determines tag-dependent positional data from the calculated travel distance from the first identified zone tag. The tag position data associated with each subsequent identified zone tag may be used to correct any error in the travel distance calculation that has accumulated between each zone tag 60. The first zone tag is defined as the zone tag 60 of the unique set of zone tags 65 that is first identified after identification of the zone identification tag 55. Each subsequent zone tag are those zone tags 60 of the unique set of zone tags 65 that are not the first zone tag 60.

In yet another example, as discussed hereinabove, tag-dependent positional data may be derived from an identified aisle extension tag 110. In this example, the aisle extension tag 110 would operate as the first identified zone tag and each zone tag 60 of the unique set of zone tags 65 would operate as the subsequent zone tag 60.

Referring to FIG. 1A, the industrial vehicle 10 may comprise one or more user interfaces. The user interface may comprise a storage and retrieval hardware control device 23, a vehicle speed control device 24, a touch screen hardware control interface, an automated interface 22, a steering device 14, or combinations thereof. It should be understood by those skilled in the art that the touch screen hardware control interface may be part of a display device 37 but it is not limited to being part of the display device 37. The touch screen hardware control interface may be a distinct device separate from the display device 37. It should also be understood by those skilled in the art that the storage and retrieval hardware control device 23 may be a lever, knob, a touch screen hardware control interface, or the like and configured to control the storage and retrieval hardware 20. The storage and retrieval hardware may include, but is not limited to, a set of fork tines, a container handler, a turret with forks, a pantrograph, a telescopic handler, and the like. The storage and retrieval hardware may be coupled to a set of forks already coupled to the industrial vehicle 10 or may replace pre-existing storage and retrieval hardware. The vehicle speed control device 24 may be a lever, a pedal, a touch screen hardware control interface, or the like and configured to control the vehicle drive mechanism 25. The steering device 14 may be a wheel, a knob, a lever, or the like and configured to control the steering mechanism 15.

In one embodiment, it is contemplated that the user interface comprises an override mechanism 26 for generating an override signal. The vehicle controller controls operational functions of the industrial vehicle hardware in response to override data upon receipt of the override signal. The override signal may be reset after a period of time, reset by operational data correlated to an identified tag of the tag layout 50, or deactivated by the user. Override data may include override forward speed limit data, override reverse speed limit data, override height limit data, stop data, and the like. In one non-limiting example, the user may be required to generate the override signal for the duration of time (e.g., actuate and hold the override mechanism 26) that the industrial vehicle 10 is implementing vehicle functionality with an identified tag until a next tag is identified in the tag layout 50. In addition to the requirements to actuate the override mechanism 26, a display 37 may generate a situation message for the user and an audible tone may be generated indicating the need for the override mechanism 26 to be actuated. It should be understood that any combination of generation of an override signal, display of a situation message, and generation of an audible tone is contemplated.

In one embodiment, the industrial vehicle 10 may be an automated guided vehicle. An automated interface 22 may be used to issue commands to the industrial vehicle 10, make changes to the reader memory 205 (FIG. 6), and/or remotely control the industrial vehicle 10. It is contemplated that the automated interface 22 may communicatively couple the industrial vehicle 10 to a remote computer. For example, and not by way of limitation, the automated interface 22 may be an antenna which wirelessly couples the industrial vehicle 10 to a remote computer. Alternatively, the automated interface 22 may be an input/output device such as a RS-232 connector, USB, or the like to facilitate a hard wired connection between the industrial vehicle 10 and a remote computer such as a laptop. In this embodiment, user input through the user interface is not required to control the industrial vehicle hardware.

Figure 7:
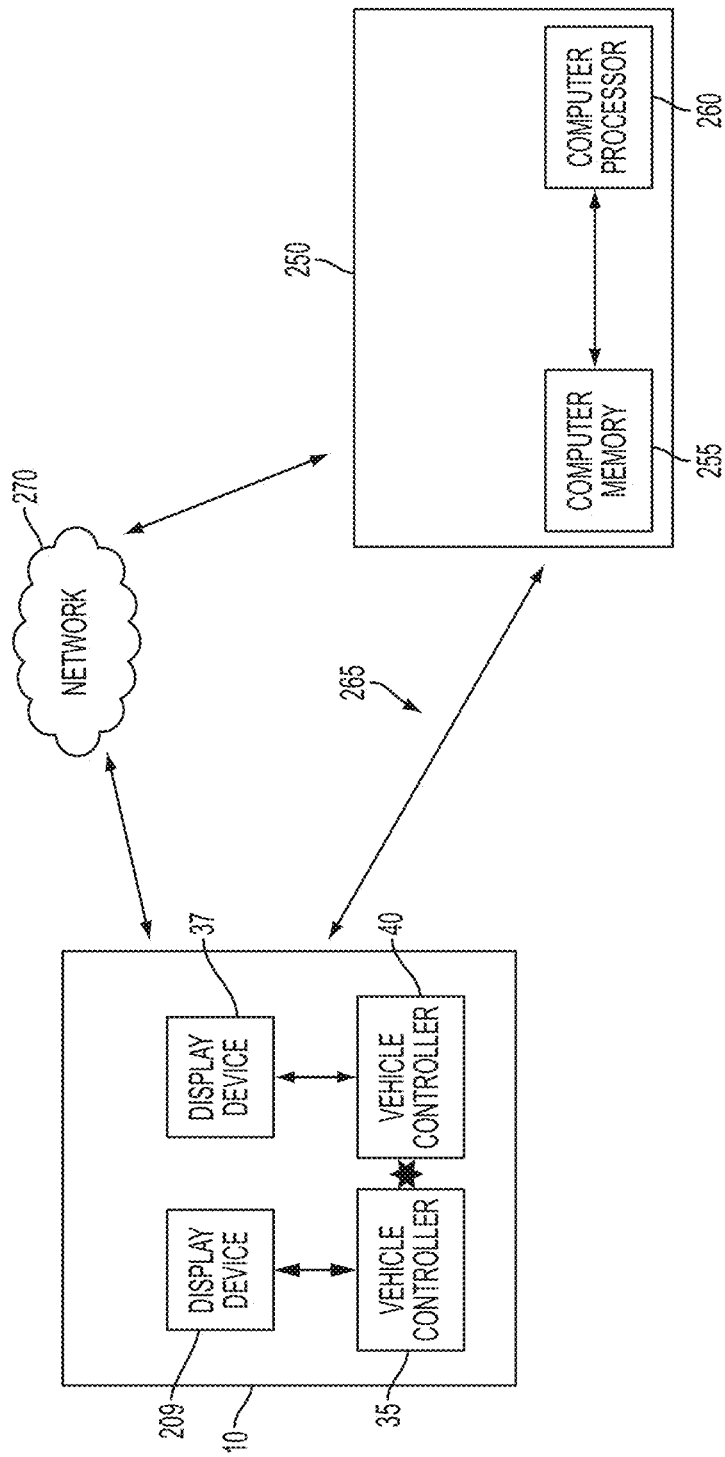
FIG. 7 is a block diagram of a system comprising a remote computer and an industrial vehicle according to one embodiment of the present disclosure.

FIG. 7 is a block diagram of a system which comprises a remote computer 250 and the industrial vehicle 10. The remote computer 250 has a computer processor 260 and a computer memory 255, which stores load location data. It is contemplated that the tags of the tag layout do not comprise load location data. The remote computer 250 is communicatively coupled to the vehicle controller 40. The vehicle controller 40 controls operational functions of the industrial vehicle hardware in response to vehicle functionality as they are correlated with load location data stored in computer memory 255 and with an identified zone tag 60 (FIG. 2), with tag-dependent positional data, or both. For example, but not limited to, the remote computer 250 may communicate with the vehicle controller 40 via a wireless connection 265 (e.g., an optical connection, radio, cellular, or the like) or through a network 270 (e.g., IEEE 802 series of protocols, or the like). For example, and not by way of limitation, the load location data may be a slot location on a shelf, a position on the floor within the warehouse, an aisle identifier, or other types of load location data. For the purposes of describing and defining the subject matter of the present disclosure a "remote" computer is a computer not secured to or part of the industrial vehicle 10. For example, a remote computer may comprise a warehouse management system.

In one embodiment, the industrial vehicle 10 may comprise an Automatic Positioning System. The Automatic Positioning System may use the load location data and/or tag-dependent positional data to automatically control the industrial vehicle hardware to vertically position the storage and retrieval hardware 20 (FIG. 1A) and horizontally position the industrial vehicle 10 to retrieve or place a load. It is also contemplated that when the industrial vehicle 10 is at a position along the aisle path 70 that corresponds to the correct load location, the vehicle controller controls the storage and retrieval hardware 20 such that the storage and retrieval hardware automatically retrieves or places the load in the slot location on the shelf. The vehicle controller 40 communicates to the remote computer 250 that the load has been placed or retrieved from the load location.

In one embodiment, the operational data correlated with the unique identification code of an identified tag may comprise an Automatic Positioning System bit. The Automatic Positioning System bit may be used by the vehicle controller to turn the Automatic Positioning System on or off. For example, and not by limitation, the Automatic Positioning System may be needed along an aisle path only. The aisle entry tags may include the Automatic Positioning System bit to turn the Automatic Positioning System on along the aisle path and turn the Automatic Positioning System off when the industrial vehicle leaves the aisle path.

The industrial vehicle hardware may comprise an indication light (not shown). The indication light may be illuminated when the storage and retrieval hardware 20 is, for example, at the correct slot location on a shelf. For example, and not by way of limitation, the indication light may illuminate to indicate a correct horizontal position and subsequently a correct vertical position, or vice versus.

The vehicle controller 40 may communicate a position of the industrial vehicle 10 to the remote computer 250. The remote computer 250 may, for example and not by way of limitation, alert or communicate to a second industrial vehicle 10 that an aisle path 70 (FIG. 2) is occupied by a first industrial vehicle 10 when the position of both industrial vehicles indicate that they may or are about to occupy the same aisle path 70. The remote computer 250 may communicate vehicle functionality, such as override data for example, to the vehicle controller 40 to stop and/or prevent the second industrial vehicle 10 from entering and occupying the same aisle path 70 as the first industrial vehicle 10.

It is contemplated that the vehicle controller 40 and/or the reader module 35 (FIG. 1B) may compare the load location to a current industrial vehicle 10 location. If, for example, and not by way of limitation, the user directs the industrial vehicle 10 into the wrong aisle path 70, the vehicle controller 40 may control the industrial vehicle hardware to notify the user of the error. Examples of control may include, but are not limited to, the vehicle controller 40 may bring the industrial vehicle 10 to a stop or slow the industrial vehicle 10. It is also contemplated that the display device 37 may indicate the error to the user.

The industrial vehicle 10 may also comprise a display device 37 and the vehicle controller 40 may send load location data to the display device 37. For example, but not by way of limitation, the load location may be displayed on the display device 37 to direct an operator to an aisle path 70 in which the specified load is located.

Referring to FIGS. 6 and 7, in one embodiment, the remote computer 250 may be communicatively coupled to the reader module 35. In this embodiment, the computer memory 255 comprises one or more memory locations and each unique identification code for the individual tags of the tag layout corresponds to a memory location in the computer memory 255. The memory location comprises at least one of indexing data, operational data, and tag position data. The tag reader and the reader module cooperate to identify an individual tag of the tag layout. The reader module then copies the corresponding indexing data, operational data, and tag position data corresponding to the unique identification code of the identified tag from the computer memory to the cache memory 209 of the reader module 35. For example, and not by way of limitation, the unique identification codes corresponding to a unique set of zone tags may be copied from the computer memory 255 to the cache memory 209 of the reader module to improve processing speed of identifying subsequent zone tags and implement vehicle functionality. In this embodiment, changes to the tag layout may be made at the remote computer 250 instead of on the industrial vehicle.

The tag reader 30 and the reader module 35 cooperate to determine vehicle functionality by identifying an individual tag of the tag layout 50 and associating the identified tag with a memory location 200 to retrieve at least one of indexing data, operational data, and tag position data.

Figure 8:
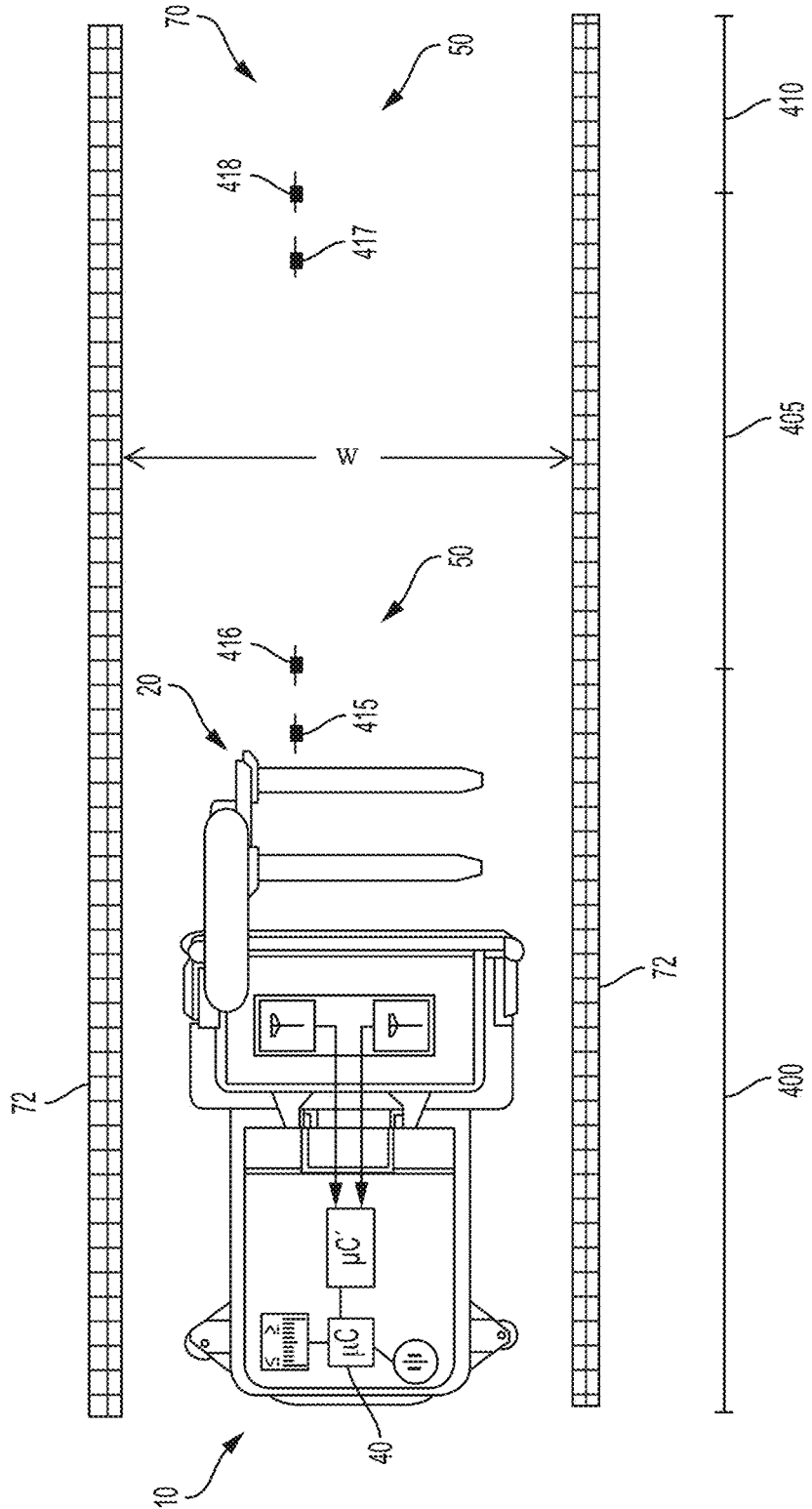
FIG. 8 is a plan view of an aisle path according to another embodiment of the present disclosure.

Referring to FIG. 8, an industrial truck 10 is shown traversing along an aisle path 70 and one or more storage elements 72. This figure illustrates a very narrow aisle (VNA) path comprising a VNA industrial vehicle operating width w. A first zone 400, a second zone 405, and a third zone 410 are delineated by the individual tags of the tag layout 50. Specifically, a first tag 415, a second tag 416, a third tag 417, and a fourth tag 418 serve to delineate the three zones along the aisle path 70.

For the following examples, and not by way of limitation, the second zone 405 will have vehicle functionality implemented such as, for example, a speed setting for the industrial vehicle 10, a lift height setting of the storage and retrieval hardware 20, and/or an override speed setting which is greater than the speed setting but less than the normal operating speed of the industrial vehicle 10. The first zone 400 and the third zone 410 will allow for normal operation of the industrial vehicle 10. It should be understood that the zones in this example are not limited to the vehicle functionality described herein and may include the complete list previously described. In the following examples, for the purpose of understanding FIG. 8, the industrial vehicle 10 is traveling from left to right across the figure such that the tags are identified by the industrial vehicle 10 in the following order: the first tag 415, the second tag 416, the third tag 417, and lastly the fourth tag 418. The vehicle functionality of the second zone 405 will be implemented once the second tag 416 is identified and at least partially negated once the fourth tag 418 is identified. The table in each example below exemplifies the vehicle functionality of the four tags along the aisle path 70 for that particular non-limiting example.

It is contemplated that primary control (i.e., control which is interrupted through tag identification) of the industrial vehicle 10 may be either through a user's control or automated control such as an AGV. As such, although a user is described in control of the industrial vehicle 10 in the below examples, it should be understood that the examples are not limited to a user having primary control over the industrial vehicle 10 and the industrial vehicle 10 may be an AGV.

It is also contemplated that, although not described in the below examples, tag-dependent positional data may be used in addition to the four tags to further define the location of the industrial vehicle 10 along the aisle path 70 and/or to implement the correlated vehicle functionality at locations other than when the subject tag is identified. In other words, to clarify the second point, the implementation of vehicle functionality may not occur at the location in which a tag is identified, but at some distance beyond the location, either positive or negative travel direction of the industrial vehicle 10, of the subject tag's identification. Further, it is contemplated that additional vehicle functionality, such as end of aisle control, may be combined with the examples below and as such, the examples are not limited only to the vehicle functionality described.

Example 1: Speed Settings, Non-Zero

TABLE 1

Vehicle functionality for Example 1.

| Tag | Speed Setting |
| --- | --- |
| First tag 415 | No speed setting |
| Second tag 416 | Speed = 1341 mm/sec (3 mph) |
| Third tag 417 | Speed = 1341 mm/sec (3 mph) |
| Fourth tag 418 | No speed setting |

In this non-limiting example, when the industrial vehicle 10 identifies the first tag 415, the vehicle controller 40 does not intervene in the control of the industrial vehicle 10 speed along the aisle path 70. When the industrial vehicle 10 identifies the second tag 416, if the industrial vehicle 10 is traveling at a speed greater than 1341 mm/sec (3 mph), the vehicle controller 40 will control the vehicle drive mechanism 25 (FIG. 1A) and/or brakes to decelerate the truck to 1341 mm/sec (3 mph) and maintain that maximum speed setting until a subsequent identified tag changes the speed setting. Further, the display device 37 (FIG. 1A) will display "Speed Zone" and generate an audible tone to indicate that vehicle functionality in the form of a speed setting is implemented at the current location of the industrial vehicle 10 if a user is at the controls of the industrial vehicle 10. If the industrial vehicle 10 is operated below 1341 mm/sec (3 mph) then the vehicle controller 40 does not intervene in the speed of the industrial vehicle 10. When the third tag 417 is identified, the vehicle functionality is unchanged and the vehicle controller 40 continues to intervene as necessary in accordance with TABLE 1. When the fourth tag 418 is identified, the vehicle controller 40 will no longer intervene with a 1341 mm/sec (3 mph) speed setting and the display device 37 will no longer indicate a "Speed Zone."

Example 2: Speed Setting, Zero

TABLE 2

Vehicle functionality for Example 2.

| Tag | Speed Setting | Override Setting |
|---|---|---|
| First tag 415 | No speed setting | No override setting |
| Second tag 416 | Speed = 0 mm/sec (0 mph) | Override setting: Speed = 670 mm/sec (1.5 mph) |
| Third tag 417 | Speed = 0 mm/sec (0 mph) | Override setting: Speed = 670 mm/sec (1.5 mph) |
| Fourth tag 418 | No speed setting | No override setting |

In this non-limiting example, when the industrial vehicle 10 identifies the first tag 415, the vehicle controller 40 does not intervene in the control of the industrial vehicle 10 speed along the aisle path 70. When the industrial vehicle 10 identifies the second tag 416, the vehicle controller 40 will control the vehicle drive mechanism 25 (FIG. 1A) and/or brakes to decelerate the truck to a stop. Further, the display device 37 (FIG. 1A) will display "Speed Zone" and generate an audible tone to indicate that vehicle functionality in the form of a speed setting is implemented at the current location of the industrial vehicle 10. If a user would like to have the industrial vehicle 10 move, the user must execute an override sequence. In this example, the override sequence consists of transitioning the vehicle speed control device 24 (FIG. 1A) to neutral and the display device 37 will indicate "Cutout, Use Override." The user will then press and hold the override mechanism 26 (FIG. 1A). The display device 37 will display "Speed Zone" and the vehicle controller 40 will intervene in any speeds above 670 mm/sec (1.5 mph). The user may transition or actuate the vehicle speed control device 24 to indicate the desire for motion and the industrial vehicle will move with a maximum speed of 670 mm/sec (1.5 mph). Once the fourth tag 418 is identified, the need for the override sequence is eliminated and the user may release the override mechanism 26. The display device 37 will no longer indicate "Speed Zone" and the industrial vehicle 10 will operate normally. Alternatively, if the industrial vehicle is an AGV, the implemented vehicle functionality will control without an override sequence.

If the user fails to transition the vehicle speed control device 24 to neutral after the industrial vehicle 10 comes to a stop and the display device 37 indicates "Speed Zone," the display device 37 will indicate instructions to the user. For example, and not by way of limitation, the display device 37 may indicate "Center Hand Controls." Once the vehicle speed control device 24 is transitioned to neutral, the override sequence may be initiated.

If, during the override sequence, the user releases the override mechanism 26 while the industrial vehicle 10 is moving, the display device 37 may indicate instructions to the user. For example, and not by way of limitation, the display device 37 may indicate "Cutout, Use Override." The industrial vehicle 10 will coast until the override mechanism 26 is pressed again.

Example 3: Height Dependent Speed Settings

TABLE 3

Vehicle functionality for Example 3.

| | | Hardware Setting | | |
|---|---|---|---|---|
| Tag | Speed Setting | Height Dependent Speed Setting | Overhead Height Setting | Override Setting |
| First tag 415 | No speed setting | No hardware setting | No Overhead setting | No override setting |
| Second tag 416 | No speed setting | Height = 2540 mm (100 inches) Speed = 1341 mm/sec (3 mph) | No Overhead setting | No override setting |
| Third tag 417 | No speed setting | Height = 2540 mm (100 inches) Speed = 1341 mm/sec (3 mph) | No Overhead setting | No override setting |
| Fourth tag 418 | No speed setting | No hardware setting | No Overhead setting | No override setting |

In this non-limiting example, when the industrial vehicle 10 identifies the first tag 415, the vehicle controller 40 does not intervene in the control of the industrial vehicle 10 along the aisle path 70. When the industrial vehicle 10 identifies the second tag 416, the vehicle controller 40 will sense (through sensors, data in memory, or the like) the height of the storage and retrieval hardware 20. The height setting in this example is defined as the height of the forks or the load implement of the storage and retrieval hardware 20. If the height of the storage and retrieval hardware 20 exceeds the height setting of 2540 mm (100 inches), the vehicle controller 40 will control the vehicle drive mechanism 25 (FIG. 1A) to reduce the speed of the industrial truck to 1341 mm/sec (3 mph). The industrial vehicle 10 may operate at or below 1341 mm/sec (3 mph) while the height of the storage and retrieval hardware 20 is at or above 2540 mm (100 inches) before the fourth tag 418 is identified. If the storage and retrieval hardware 20 is lowered below 2540 mm (100 inches), then the vehicle controller 40 will not intervene in the speed of the industrial vehicle 10 before the fourth tag 418 is identified. If, after the second tag 416 or the third tag 417 is identified, the storage and retrieval hardware 20 is subsequently raised above 2540 mm (100 inches), then the vehicle controller 40 will intervene in the speed of the industrial vehicle 10 and decelerate the industrial vehicle 10 to 1342 mm/sec (3 mph). Further, the display device 37 (FIG. 1A) will display "Speed Zone" and generate an audible tone to indicate that vehicle functionality in the form of a speed setting is implemented at the current location of the industrial vehicle 10 if a user is in control of the industrial vehicle 10. The display of "Speed Zone" and generation of an audible tone will occur whenever the vehicle controller 40 intervenes on the speed of the industrial vehicle 10 due to the height of the storage and retrieval hardware 20. In this example, although not used, it is contemplated that an override sequence may be implemented to allow speeds of the industrial vehicle 10 above 1341 mm/sec (3 mph) when the height of the storage and retrieval hardware 20 is above 2540 mm (100 inches). Once the fourth tag 418 is identified, the display device 37 will no longer indicate "Speed Zone" and the industrial vehicle 10 will operate normally.

Example 4: Height Dependent Speed Settings with Overhead Height Setting

TABLE 4

Vehicle functionality for Example 4.

| Tag | Speed Setting | Hardware Setting | | |
|---|---|---|---|---|
| | | Height Dependent Speed Setting | Overhead Height Setting | Override Setting |
| First tag 415 | No speed setting | No hardware setting | Overhead setting = YES | No override setting |
| Second tag 416 | No speed setting | Height = 2540 mm (100 inches) Speed = 1341 mm/sec (3 mph) | Overhead setting = YES | No override setting |
| Third tag 417 | No speed setting | Height = 2540 mm (100 inches) Speed = 1341 mm/sec (3 mph) | Overhead setting = YES | No override setting |
| Fourth tag 418 | No speed setting | No hardware setting | Overhead setting = YES | No override setting |

In this non-limiting example, when the industrial vehicle 10 identifies the first tag 415, the vehicle controller 40 does not intervene in the control of the industrial vehicle 10 along the aisle path 70. If the overall height (i.e., topmost vertical point of the industrial vehicle 10 above the vehicle travel plane p (FIG. 1A)) of the storage and retrieval hardware 20 exceeds the height setting of 2540 mm (100 inches), the vehicle controller 40 will control the vehicle drive mechanism 25 (FIG. 1A) and/or brakes to the industrial truck to a stop in accordance with the speed settings. This will allow an industrial vehicle 10 to avoid an overhead obstruction by coming to a stop. It is contemplated that an override sequence may be implemented to allow the industrial vehicle 10 to move when the overall height of the storage and retrieval hardware 20 is above 2540 mm (100 inches) to allow a user to negotiate the overhead obstruction. Further, whenever the vehicle controller 40 intervenes on the speed of the industrial vehicle 10 due to the height of the storage and retrieval hardware 20, the display device 37 (FIG. 1A) will display "Speed Zone" and generate an audible tone to indicate that vehicle functionality in the form of a speed setting is implemented at the current location of the industrial vehicle 10. As with previous examples, once the fourth tag 418 is identified, the display device 37 will no longer indicate "Speed Zone" and the industrial vehicle 10 will operate normally.

Contrary to Example 3, in this example, the overhead height setting is active (i.e., set to "YES"). The active overhead height setting means that the height setting under the hardware setting header is not the height of the forks or load implement of the storage and retrieval hardware 20 as described in Example 3, but the overall height of the storage and retrieval hardware 20. Overall height examples include the top of the mast, lift carriage, etc. Specifically, the height setting under the hardware setting as used in Example 3 is to reduce the risk of tipping or reduce excessive speed while a load on the storage and retrieval hardware is above a specified height. By contrast, the height setting in this example with the overhead setting set as active indicates that there is an overhead obstruction (pipe, ductwork, roof girders, roll-up door, etc.) that contact with is to be avoided.

Example 5: Height Setting

TABLE 5

Vehicle functionality for Example 5.

| Tag | Height Setting | Overhead Height Setting | Override Setting |
|---|---|---|---|
| First tag 415 | No height setting | No Overhead setting | No override setting |
| Second tag 416 | Height = 2540 mm (100 inches) | No Overhead setting | Override setting: Speed = 670 mm/sec (1.5 mph) |
| Third tag 417 | Height = 2540 mm (100 inches) | No Overhead setting | Override setting: Speed = 670 mm/sec (1.5 mph) |
| Fourth tag 418 | No height setting | No Overhead setting | No override setting |

In this non-limiting example, when the industrial vehicle 10 identifies the first tag 415, the vehicle controller 40 does not intervene in the control of the industrial vehicle 10 along the aisle path 70. When the industrial vehicle 10 identifies the second tag 416, the vehicle controller 40 will control the vehicle drive mechanism 25 (FIG. 1A) and/or brakes to decelerate the truck to a stop if the height of the storage and retrieval hardware 20 is above 2540 mm (100 inches). Further, the display device 37 (FIG. 1A) will display "Height Zone" and generate an audible tone to indicate that vehicle functionality in the form of a height setting is implemented at the current location of the industrial vehicle 10 if a user is in control of the industrial vehicle 10. If the user would like to have the industrial vehicle 10 move, the user may either execute an override sequence or lower the storage and retrieval hardware 20 below 2540 mm (100 inches) to continue normal operation. As another example of the override sequence for these examples, the override sequence consists of transitioning the vehicle speed control device 24 (FIG. 1A) to neutral and the display device 37 will indicate "Cutout, Use Override." In this example of the override sequence, the user will then actuate the override mechanism 26 (FIG. 1A) (e.g., momentary switch, touch screen radio button, or other means of instructing to override the current cutout without prolonged holding of a button). The user may then transition/actuate the vehicle speed control device 24 to the desired speed however, per the override settings, the vehicle controller 40 will intervene in any speeds of the industrial vehicle 10 above 670 mm/sec (1.5 mph). Once the fourth tag 418 is identified, the need for the override sequence is eliminated. The display device 37 will no longer indicate "Height Zone" and the industrial vehicle 10 will operate normally. To reiterate with these examples, if the industrial vehicle is an AGV, the implemented vehicle functionality will control without an override sequence as the industrial vehicle will automatically comply with the correlated vehicle functionality.

In another example, the overhead setting may be set to active ("YES"). The only difference between this example and Example 5 is the height at which the vehicle controller 40 intervenes on the control of the industrial vehicle 10 (i.e., height of the forks versus the overall height of the storage and retrieval hardware).

Example 6: Auto Hoist Zones

TABLE 6

Vehicle functionality for Example 6.

| Tag | Automatic Positioning System Setting | Override Setting |
|---|---|---|
| First tag 415 | No hoist setting | No override setting |
| Second tag 416 | Hoist = lower only | No override setting |
| Third tag 417 | Hoist = lower only | No override setting |
| Fourth tag 418 | No hoist setting | No override setting |

In this non-limiting example, vehicle functionality includes an Automatic Positioning System setting. It may be desired to change the functionality of the Automatic Positioning System in a specified location of the building; the functionality of the Automatic Positioning System is discussed above. In other words, when the industrial vehicle 10 identifies the second tag 416 and/or the third tag 417, the automatic control of the industrial vehicle hardware to vertically position the storage and retrieval hardware 20 and horizontally position the industrial vehicle 10 to retrieve or place a load is changed. In this example, the Automatic Positioning System setting comprises a hoist setting. The hoist setting is set to only allow the Automatic Positioning System to automatically lower the storage and retrieval hardware 20 and not automatically raise it. Therefore, in second zone 405, the vehicle controller 40 will automatically lower the storage and retrieval hardware 20 if a slot location on a shelf is below the current height (i.e., the height of the storage and retrieval hardware 20 at which the industrial vehicle 10 entered the second zone 405) of the storage and retrieval hardware 20. If the Automatic Positioning System was automatically raising the storage and retrieval hardware 20 when entering the second zone 405, the storage and retrieval hardware 20 will cease to raise. While in the second zone 405, the display device 37 (FIG. 1A) will display "Raise to Piece/Pallet" to indicate that the user needs to manually raise the storage and retrieval hardware 20 to the slot location on the shelf. Alternatively, the hoist setting may be set to "Raise" or "None" instead of "Lower." The "raise" indicates that the storage and retrieval hardware 20 may only raise and "none" indicates that the Automatic Positioning System will not either "lower" or "raise" the storage and retrieval hardware and manual operation is required by the user.

Example 7: Combined Settings

TABLE 7

Vehicle functionality for Example 7.

| Tag | Speed Setting | Height Setting | Hardware Setting Height Dependent Speed Setting | Overhead Height Setting | Override Setting |
|---|---|---|---|---|---|
| First tag 415 | No speed setting | No height setting | No hardware setting | No Overhead setting | No override setting |
| Second tag 416 | Speed = 1341 mm/sec (3 mph) | Height = 2540 mm (100 inches) | Height = 1270 mm (50 inches) Speed = 894 mm/sec (2 mph) | No Overhead setting | Override setting: Speed = 670 mm/sec (1.5 mph) |
| Third tag 417 | Speed = 1341 mm/sec (3 mph) | Height = 2540 mm (100 inches) | Height = 1270 mm (50 inches) Speed = 894 mm/sec (2 mph) | No Overhead setting | Override setting: Speed = 670 mm/sec (1.5 mph) |
| Fourth tag 418 | No speed setting | No height setting | No hardware setting | No Overhead setting | No override setting |

In this non-limiting example, combinations of the above settings may be used. In the second zone 405, the speed of the industrial truck is set to operate at or below 1341 mm/sec (3 mph) as described in Example 1. The industrial vehicle will not be able to operate above this speed while in the second zone 405. Furthermore, the height of the storage and retrieval hardware 20 is set to operate at or below 2540 mm (100 inches) as described in Example 5. The user may use the override mechanism to lower the height of the storage and retrieval hardware 20 below 2540 mm (100 inches) to allow for normal operation within the second zone 405. The vehicle functionality table also indicates a height dependent speed setting under the hardware setting header as described in Example 3 and the override sequence as described in Example 2.

Auto Fence Examples.

Figure 9:
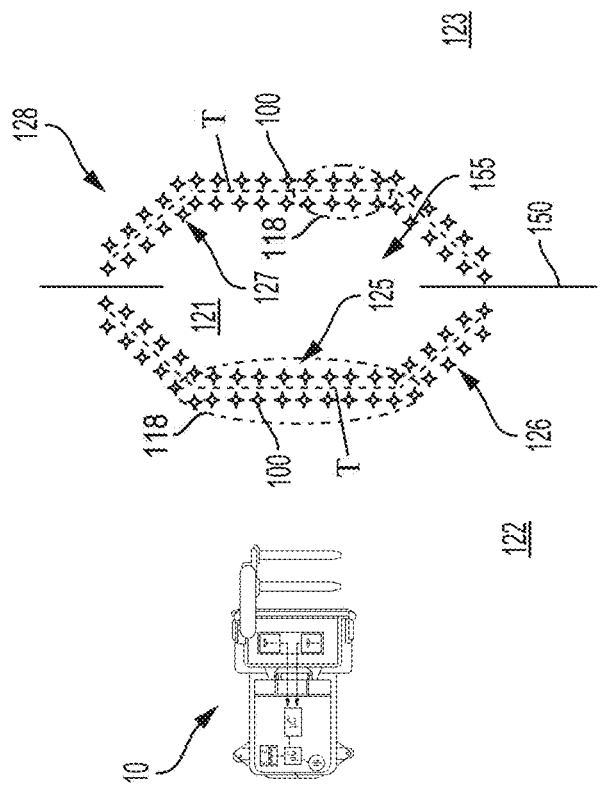
FIG. 9 is a plan view of a tag layout according to another embodiment of the present disclosure.

Referring to FIGS. 4 and 9, it is contemplated that an industrial facility 150 according to the present disclosure may comprise one or more ingress/egress zones 121 located on the vehicle travel plane of the facility 150. These ingress/egress zones 121 may be bounded in their respective entireties by a double row of tags 118, by two or more double rows of tags 118, or by a combination of one or more double rows of tags 118 and one or more selected facility boundaries, examples of which are illustrated in FIGS. 4 and 9. More specifically, contemplated ingress/egress zones may be operatively bounded in their entirety by a double row of tags, two or more double rows of tags, a combination of one or more double rows of tags and one or more selected facility boundaries, a combination of one or more double rows of tags and an aisle path, a combination of one or more double rows of tags and a facility passageway, a combination of one or more double rows of tags and a plurality of aisle paths, or a combination of two or more double rows of tags and a facility wall. Contemplated facility boundaries that may contribute to bounding an ingress/egress zone include, but are not limited to, an aisle path 70 of the industrial facility 150, a passageway 155 of the industrial facility 150, a wall, a step, an elevation change in the vehicle travel plane, another type of transport barrier, or combinations thereof.

Although some of the ingress/egress zones 121 contemplated by the present disclosure may be located outside of an area of the vehicle travel plane occupied by an aisle path 70, it is also contemplated that, in some embodiments, the ingress/egress zone 121 may be located at least partially within an area of the vehicle travel plane occupied by an aisle path 70. An example of this type of ingress/egress zone 121 is also illustrated in FIG. 4. For these types of configurations, the ingress/egress zone 121 may be located entirely within the aisle path 70. In which case, it will often be practical to ensure that the double row of tags 118 spans an ingress/egress threshold that extends laterally across the aisle path 70 at an end of the aisle path 70, or at some other point along the aisle path 70.

Each double row of tags 118 comprises an inner row of tags and an outer row of tags. For example, referring to FIG. 9, an industrial vehicle 10 is shown in relation to a set of double tag rows 118 bounding a passageway 155 in a building 150. Each double row 118 of tags 100 comprises an inner row of tags 125/127 and an outer row of tags 126/128. These double rows of tags 118 are arranged in respective n×m matrices of n tag rows and m tag columns (m>n>1) that are configured for successive detection of the inner and outer rows of tags. This successive detection is dependent on the point-of-origin of a sensor transit path across each double row of tags 118. More specifically, individual tags of the outer row of tags 126/128 are closer to points of entry into said ingress/egress zone 121 than are individual tags of the inner row of tags 125/127. In addition, individual tags of the inner row of tags 125/127 are closer to points of exit from the ingress/egress zone 121 than are individual tags of the outer row of tags 126/128. In this manner, it is contemplated that every double row 118 in the tag layout can be positioned such that an industrial vehicle 10 cannot approach a selected location of a building 150 without identifying a function tag 100 correlated with vehicle functionality for that selected location of the building 150. For example, and not by way of limitation, an ingress/egress zone 121, which is illustrated more particularly as a passage zone 121 in FIG. 9, will have vehicle functionality implemented such as, for example, a speed setting for the industrial vehicle 10, a lift height setting of the storage and retrieval hardware 20, and/or an override speed setting. A first outer zone 122 and a second outer zone 123 will allow for normal operation of the industrial vehicle 10.

In one embodiment, the double row of tags 118 is characterized by a row spacing s that is smaller than the industrial vehicle operating width w. In an industrial facility 150 that comprises a plurality of aisle paths 70, a majority of these aisle paths 70 will often be configured to comprise, i.e., correspond to, a common industrial vehicle operating width w. This is illustrated in FIGS. 4 and 8. In addition, it is contemplated that, in many instances, the double row of tags 118 will span an ingress/egress threshold T that is large enough to accommodate the industrial vehicle operating width w. Further, the ingress/egress zones 121 will typically be large enough to accommodate the industrial vehicle operating width w. It is noted that the aforementioned ingress/egress threshold T may be a simple linear threshold, a compound linear threshold, curved, or curvilinear.

Referring to FIG. 9, an industrial vehicle 10 is shown in relation to a set of double row 118 of function tags 100 bounding a passageway 155 in a building 150. Each double row 118 of function tags 100 comprises an inner row 125/127 and an outer row 126/128 of function tags 100. For this set of Auto Fence examples, and not by way of limitation, the function tags 100 in the first inner row 125 and second inner row 127 have the same unique identification code defining vehicle functionality for a passage zone 121, all of the function tags 100 in the first outer row 126 have the same unique identification code defining vehicle functionality for a first outer zone 122, and all of the function tags 100 in the second outer row 128 have the same unique identification code defining vehicle functionality for a second outer zone 123. It is contemplated that the vehicle functionality correlated with each zone can be changed by revising a single memory location corresponding to the common unique identification code.

In one embodiment, individual tags of the outer row of tags 126/128 are be spaced such that their transmit signal ranges are sufficient to provide a continuous read threshold for sensors traversing a sensor transit path across the outer row of tags 126/128. Further, individual tags of the inner row of tags 125/127 are spaced such that their transmit signal ranges are sufficient to provide a continuous read threshold for sensors traversing a sensor transit path across the inner row of tags 125/127. In a more specific embodiment, this read threshold continuity is maintained by ensuring that the respective transmit signal ranges in the inner and outer rows overlap.

For the purpose of understanding FIG. 9 in view of the below examples, the industrial vehicle 10 is traveling from left to right such that the tags are identified by the industrial vehicle 10 in the following order: the first outer row 126, the first inner row 125, the second inner row 127, and lastly the second outer row 128. The vehicle functionality of the passage zone 121 will be implemented once a function tag 100 of the inner row 125 (or inner row 127 if traveling in a right to left direction) is identified and replaced with new vehicle functionality to include at least partial negation of the vehicle functionality of the passage zone 121 when a function tag 100 of either outer row 126/128 is identified.

Example 8: Auto Fence Speed Settings, Non-Zero

TABLE 8

| Vehicle functionality for Example 8. | |
|---|---|
| Tag | Speed Setting |
| First outer row 126 | No speed setting |
| First inner row 125 | Speed = 894 mm/sec (2 mph) |
| Second inner row 127 | Speed = 894 mm/sec (2 mph) |
| Second outer row 128 | No speed setting |

In this non-limiting example, when the industrial vehicle 10 identifies the first outer row 126, the vehicle controller does not intervene in the control of the industrial vehicle 10. When the industrial vehicle 10 identifies the first inner row 125, if the industrial vehicle 10 is traveling at a speed greater than 894 mm/sec (2 mph), the vehicle controller will control the vehicle drive mechanism 25 (FIG. 1A) and/or brakes to decelerate the truck to 894 mm/sec (2 mph) and maintain that speed setting or slower until a subsequent identified tag changes the speed setting. Further, the display device 37 (FIG. 1A) will display "Speed Zone" and generate an audible tone to indicate that vehicle functionality in the form of a speed setting is implemented at the current location of the industrial vehicle 10. If the industrial vehicle 10 is operated below 894 mm/sec (2 mph) then the vehicle controller does not intervene in the speed of the industrial vehicle 10. When the second inner row 127 is identified, the vehicle functionality is unchanged and the vehicle controller continues to intervene as necessary in accordance with TABLE 8. When the second outer row 128 is identified, the vehicle controller will no longer intervene with an 894 mm/sec (2 mph) speed setting and the display device 37 will no longer indicate a "Speed Zone."

Example 9: Auto Fence Speed Setting, Zero

TABLE 9

Vehicle functionality for Example 9.

| Tag | Speed Setting | Override Setting |
|---|---|---|
| First outer row 126 | No speed setting | No override setting |
| First inner row 125 | Speed = 0 mm/sec (0 mph) | Override setting: Speed = 670 mm/sec (1.5 mph) |
| Second inner row 127 | Speed = 0 mm/sec (0 mph) | Override setting: Speed = 670 mm/sec (1.5 mph) |
| Second outer row 128 | No speed setting | No override setting |

In this non-limiting example, when the industrial vehicle 10 identifies the first outer row 126, the vehicle controller does not intervene in the control of the industrial vehicle 10. When the industrial vehicle 10 identifies the first inner row 125, the vehicle controller will control the vehicle drive mechanism 25 (FIG. 1A) and/or brakes to decelerate the truck to a stop. Further, the display device 37 (FIG. 1A) will display "Speed Zone" and generate an audible tone to indicate that vehicle functionality in the form of a speed setting is implemented at the current location of the industrial vehicle 10 if a user is in control of the industrial vehicle 10. If the user would like to have the industrial vehicle 10 move, the user must execute an override sequence. For example, and not by way of limitation, the override sequence consists of transitioning the vehicle speed control device 24 (FIG. 1A) to neutral and the display device 37 will indicate "Cutout, Use Override." The user will then press and hold the override mechanism 26 (FIG. 1A). The display device 37 will display "Speed Zone" and the vehicle controller will intervene in any speeds above 670 mm/sec (1.5 mph). The user may transition or actuate the vehicle speed control device 24 to indicate the desire for motion and the industrial vehicle will move with a maximum speed of 670 mm/sec (1.5 mph). Once the second outer row 128 is identified, the need for the override sequence is eliminated and the user may release the override mechanism 26. The display device 37 will no longer indicate "Speed Zone" and the industrial vehicle 10 will operate normally.

If the user fails to transition the vehicle speed control device 24 to neutral after the industrial vehicle 10 comes to a stop and the display device 37 indicates "Speed Zone," the display device 37 will indicate instructions to the user. For example, and not by way of limitation, the display device 37 may indicate "Center Hand Controls." Once the vehicle speed control device 24 is transitioned to neutral, the override sequence may be initiated. If, during the override sequence, the user releases the override mechanism 26 while the industrial vehicle 10 is moving, the display device 37 may indicate instructions to the user. For example, and not by way of limitation, the display device 37 may indicate "Cutout, Use Override." The industrial vehicle 10 will coast until the override mechanism 26 is pressed again.

Example 10: Height Dependent Speed Settings

TABLE 10

Vehicle functionality for Example 10.

| | | Hardware Setting | | |
|---|---|---|---|---|
| Tag | Speed Setting | Height Dependent Speed Setting | Overhead Height Setting | Override Setting |
| First outer row 126 | No speed setting | No hardware setting | No Overhead setting | No override setting |
| First inner row 125 | No speed setting | Height = 1524 mm (60 inches) Speed = 894 mm/sec (2 mph) | No Overhead setting | No override setting |
| Second inner row 127 | No speed setting | Height = 1524 mm (60 inches) Speed = 894 mm/sec (2 mph) | No Overhead setting | No override setting |
| Second outer row 128 | No speed setting | No hardware setting | No Overhead setting | No override setting |

In this non-limiting example, when the industrial vehicle 10 identifies the first outer row 126, the vehicle controller does not intervene in the control of the industrial vehicle 10. When the industrial vehicle 10 identifies the first inner row 125, the vehicle controller will sense (through sensors, data in memory, or the like) the height of the storage and retrieval hardware 20. The height setting in this example is defined as the height of the forks or the load implement of the storage and retrieval hardware. If the height of the storage and retrieval hardware exceeds the height setting of 1524 mm (60 inches), the vehicle controller will control the vehicle drive mechanism 25 (FIG. 1A) to reduce the speed of the industrial truck to 894 mm/sec (2 mph). The user may operate the industrial vehicle 10 at or below 894 mm/sec (2 mph) while the height of the storage and retrieval hardware is at or above 1524 mm (60 inches) before the second outer row 128 is identified. If the user lowers the storage and retrieval hardware below 1524 mm (60 inches), then the vehicle controller will not intervene in the speed of the industrial vehicle 10 before the second outer row 128 is identified. If, after the first inner row 125 or the second inner row 127 is identified, the user subsequently raises the storage and retrieval hardware above 1524 mm (60 inches), then the vehicle controller will intervene in the speed of the industrial vehicle 10 and decelerate the industrial vehicle 10 to 894 mm/sec (2 mph). Further, the display device 37 (FIG. 1A) will display "Speed Zone" and generate an audible tone to indicate that vehicle functionality in the form of a speed setting is implemented at the current location of the industrial vehicle 10. The display of "Speed Zone" and generation of an audible tone will occur whenever the vehicle controller intervenes on the speed of the industrial vehicle 10 due to the height of the storage and retrieval hardware. In this example, although not used, it is contemplated that an override sequence may be implemented to allow speeds of the industrial vehicle 10 above 894 mm/sec (2 mph) when the height of the storage and retrieval hardware is above 1524 mm (60 inches). Once the second outer row 128 is identified, the display device 37 will no longer indicate "Speed Zone" and the industrial vehicle 10 will operate normally.

Example 11: Height Dependent Speed Settings with Overhead Height Setting

TABLE 11

Vehicle functionality for Example 11.

| | | Hardware Setting | | |
|---|---|---|---|---|
| Tag | Speed Setting | Height Dependent Speed Setting | Overhead Height Setting | Override Setting |
| First outer row 126 | No speed setting | No hardware setting | Overhead setting = YES | No override setting |
| First inner row 125 | No speed setting | Height = 2540 mm (100 inches) Speed = 1341 mm/sec (3 mph) | Overhead setting = YES | No override setting |
| Second inner row 127 | No speed setting | Height = 2540 mm (100 inches) Speed = 1341 mm/sec (3 mph) | Overhead setting = YES | No override setting |
| Second outer row 128 | No speed setting | No hardware setting | Overhead setting = YES | No override setting |

In this non-limiting example, when the industrial vehicle 10 identifies the first outer row 126, the vehicle controller does not intervene in the control of the industrial vehicle 10. If the overall height (i.e., topmost vertical point of the industrial vehicle 10 above the vehicle travel plane p (FIG. 1A)) of the storage and retrieval hardware exceeds the height setting of 2540 mm (100 inches), the vehicle controller will control the vehicle drive mechanism 25 (FIG. 1A) and/or brakes to the industrial truck to a stop in accordance with the speed settings. This will allow an industrial vehicle 10 to avoid the overhead obstruction by coming to a stop. It is contemplated that an override sequence may be implemented to allow the industrial vehicle 10 to move when the overall height of the storage and retrieval hardware is above 2540 mm (100 inches) to allow a user to negotiate the overhead obstruction. Further, whenever the vehicle controller intervenes on the speed of the industrial vehicle 10 due to the height of the storage and retrieval hardware, the display device 37 (FIG. 1A) will display "Speed Zone" and generate an audible tone to indicate that vehicle functionality in the form of a speed setting is implemented at the current location of the industrial vehicle 10. As with previous examples, once the second outer row 128 is identified, the display device 37 will no longer indicate "Speed Zone" and the industrial vehicle 10 will operate normally.

Example 12: Height Setting

TABLE 12

Vehicle functionality for Example 12.

| Tag | Height Setting | Overhead Height Setting | Override Setting |
|---|---|---|---|
| First outer row 126 | No height setting | No Overhead setting | No override setting |
| First inner row 125 | Height = 2540 mm (100 inches) | No Overhead setting | Override setting: Speed = 670 mm/sec (1.5 mph) |
| Second inner row 127 | Height = 2540 mm (100 inches) | No Overhead setting | Override setting: Speed = 670 mm/sec (1.5 mph) |
| Second outer row 128 | No height setting | No Overhead setting | No override setting |

In this non-limiting example, when the industrial vehicle 10 identifies the first outer row 126, the vehicle controller does not intervene in the user's control of the industrial vehicle 10. When the industrial vehicle 10 identifies the first inner row 125, the vehicle controller will control the vehicle drive mechanism 25 (FIG. 1A) and/or brakes to decelerate the truck to a stop if the height of the storage and retrieval hardware is above 2540 mm (100 inches). Further, the display device 37 (FIG. 1A) will display "Height Zone" and generate an audible tone to indicate that vehicle functionality in the form of a height setting is implemented at the current location of the industrial vehicle 10 if a user is in control of the industrial vehicle 10. If the user would like to have the industrial vehicle 10 move, the user may either execute an override sequence or lower the storage and retrieval hardware below 2540 mm (100 inches) to continue normal operation. Once the second outer row 128 is identified, the need for the override sequence is eliminated. The display device 37 will no longer indicate "Height Zone" and the industrial vehicle 10 will operate normally.

Figure 10:
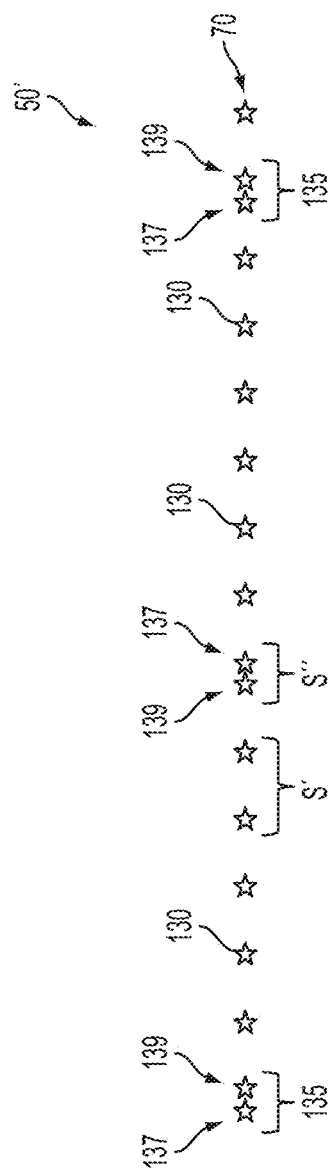
FIG. 10 is a plan view of a tag layout according to another embodiment of the present disclosure.

Referring to FIG. 10, it is contemplated that, where a tag layout 50' comprises a plurality of tags 130 sequenced along an aisle path 70, the sequence of those tags 130 are in accordance with a sequence list that is accessible to the reader module 35. Noting that a sequenced tag 130 may not be functioning properly, i.e., due to physical damage, normal wear and tear, low battery power, installation error, or an error in the sequence list, the reader module 35 compares a succession of identified sequenced tags 130 with at least a portion of the accessible sequence list to determine if the succession of sequenced tags 130 is in sequence along the aisle path 70. The reader module 35 then generates a missing tag signal for a malfunctioning tag of the plurality of sequenced tags 130 when the comparison indicates a sequence irregularity. It is contemplated that each aisle path 70 may correspond to a sequence list specific to the individual tags positioned along that aisle path 70. Each sequenced tag 130 corresponds to a unique identification code. The sequence list corresponds to one or more memory locations 200 that are stored in a known order corresponding to the succession of the plurality of sequenced tags 130 along the aisle path 70. Alternatively, it is contemplated that a sequence list is specific to the entire tag layout 50 (FIGS. 2 and 3). In one embodiment, the unique identification codes corresponding to the portion of the sequence list are loaded into cache memory 209 (FIG. 4).

Where a missing tag signal is generated, it is contemplated that the reader module 35 may correlate vehicle functionality with the corresponding malfunctioning sequenced tag to enable the vehicle controller 40 to control operational functions of the industrial vehicle hardware in response to the correlation of vehicle functionality with the malfunctioning sequenced tag. In this manner, the industrial truck 10 can recognize that a sequenced tag 130 is malfunctioning and still be able to apply the appropriate vehicle functionality from the reader memory 205 for that malfunctioning sequenced tag. In other words, a malfunctioning sequenced tag will not hinder the operation of the industrial truck 10 because the appropriate vehicle functionality associated with each sequenced tag 130 are stored in the reader memory, or elsewhere, and are not derived from the individual tag. Therefore, it is contemplated that the vehicle controller 40 controls operational functions of the industrial vehicle hardware in response to (i) the correlation of vehicle functionality with the malfunctioning sequenced tag when a missing tag signal is generated, (ii) the correlation of vehicle functionality with an identified tag in the tag layout (50 shown in FIGS. 2 and 3, and 50' shown in FIG. 10), tag-dependent positional data, or both, (iii) user input at the user interface of the industrial vehicle 10, or (ii) combinations thereof More specifically, referring to FIG. 10, the individual tags of the tag layout 50' comprise a plurality of tag pairs 135. Each tag pair of the plurality of tag pairs 135 comprises a primary tag 137 and a secondary tag 139 that are sequenced in the tag layout 50' in accordance with the sequence list that is accessible to the reader module 35. The reader module 35 compares the succession of an identified primary tag 137 and an identified secondary tag 139 with at least a portion of the accessible sequence list to determine if the succession of the of tag pair 135 is in sequence in accordance with the sequence list. The reader module 35 generates a missing tag signal for a primary tag 137 that is malfunctioning or a secondary tag 139 that is malfunctioning when the comparison of the succession of the identified primary tag 137 and the identified secondary tag 139 with the sequence list indicates a sequence irregularity in the tag pair 135.

The reader module 35 may correlate vehicle functionality, tag-dependent positional data, or both, with an identified individual tag of the tag pair 135. For example, and not by way of limitation, the reader module 35 may make the correlation with the secondary tag of the tag pair 135. In which case, when both tags in the tag pair 135 are identified, the primary tag will be ignored for the purposes of correlating vehicle functionality, tag-dependent positional data, or combinations thereof with the identified tag pair 135. It should be understood that the primary tag 137 and the secondary tag 139 may be positioned in any order in relation to each other along the aisle path 70 and the term "primary" means that that individual tag of the tag pair 135 is identified first and "secondary" means that that individual tag is identified second. As discussed hereinabove, it is contemplated that an individual tag in the tag layout may be correlated with different vehicle functionality, tag-dependent positional data, or both depending on travel direction of the industrial vehicle. For example, and not by limitation, the "primary" tag may be the "secondary" tag depending on the travel direction of the industrial vehicle 10.

Although FIG. 10 illustrates particular examples of tag pairs, it is contemplated that a variety of tags of a particular tag layout can be designated as respective individual tags of a tag pair 135. For example, and not by way of limitation, in the tag layout of FIG. 10, comprises a succession of individual tags 130 that are spaced uniformly to define a tag spacing s'. This succession of individual tags 130 may be interrupted by one or more tag pairs 135 comprising a primary tag 137 and a secondary tag 139. The primary tag 137 and the secondary tag 139 of each tag pair define a tag spacing s", where the spacing s' is greater than the tag spacing s". In this manner, the tag pairs 135 can be readily distinguished from the remaining tags because a majority of the individual tags of the tag layout 50' define the tag spacing s', which is greater than the tag spacing s" between the primary tag 137 and the secondary tag 139 of each tag pair 135. Stated differently, the tag pairs 135 are comprised of individual tags that are relatively close to each other. In one embodiment, it is contemplated that the tag spacing s" of each tag pair 135 may be set to fall between approximately 2 inches (50 mm) and approximately 12 inches (305 mm). In more particular embodiments, it may be preferable to ensure that the tag spacing s" is smaller, e.g., between approximately 9 inches (229 mm) and approximately 11 inches (280 mm). For example, and not by way of limitation, it is contemplated that a tag spacing s" of about 10 inches (254 mm) would permit reliable identification of malfunctioning tags under many expected operating parameters.

It should be understood that, although a single aisle path 70 is described, the tag layout 50' may comprise multiple aisle paths 70, as shown, for example, in FIG. 2. It should also be understood that any of a variety of tags in a particular tag layout may be replaced by a tag pair 135 having a primary tag and a secondary tag, each occupying the same position and having the same functionality as the respective individual tags replaced by the tag pair 135. For example, and not by limitation, select ones of the plurality of tag pairs 135 may comprise a pair of aisle entry tags 75, a pair of aisle extension tags 110, a pair of aisle group tags 55, a pair of zone tags 60, a pair of restricted peripheral tags 105, or a pair of unrestricted peripheral tags 100, or combinations thereof; the respective positioning and functionality of which is described in detail above.

Figure 11:
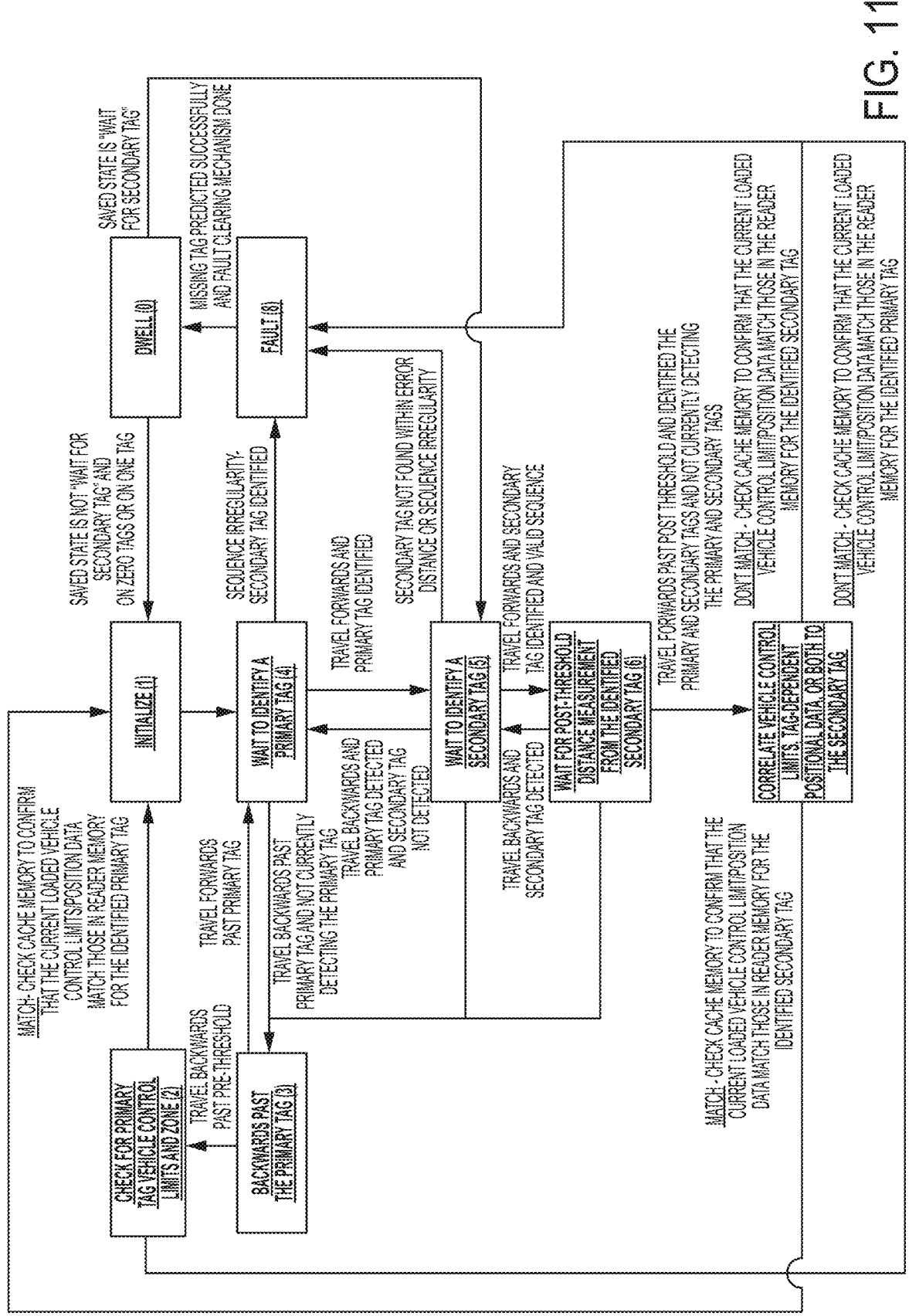
FIG. 11 is a flowchart to identify a malfunctioning tag according to another embodiment of the present disclosure.
Figure 12:
FIG. 12 is a plan view of a tag layout with tag pairs according to another embodiment of the present disclosure.

Referring to FIG. 11, it is contemplated that when a malfunctioning tag in the tag pair 135 is identified, either by a sequence irregularity or not identifying an individual tag after a specified travel distance has been met (described hereinbelow), the reader module 35 (FIG. 4) advances or retards the reader memory 205 one memory location 200 from the memory location 200 corresponding to the primary tag 137 to the memory location 200 corresponding to the secondary tag 139 when comparison of the succession of the primary tag 137 and the secondary tag 139 with the sequence list indicates a sequence irregularity in the plurality of tag pairs 135 or when an error distance measurement threshold is exceeded by the tag distance measurement L' (FIG. 12). In one embodiment, the error distance measurement threshold may correspond to a position of the secondary tag 139 along the aisle path 70. The advancement or retardation from the memory location 200 corresponding to the primary tag 137 is dependent on a travel direction of the industrial vehicle 10 (FIG. 1A) along the aisle path 70 (FIG. 2B). The reader module 35 will correlate vehicle functionality with a current location of the industrial vehicle 10 and the vehicle controller 40 (FIG. 1B) will control the operational functions of the industrial vehicle hardware in response to the correlation of vehicle functionality with the current location of the industrial vehicle 10. It should be understood that the ability to predict a next tag by either advancing or retarding the memory locations 200 of the reader memory 205 may be applied to any set of sequence tags (i.e., the unique set of zone tags 65, FIG. 2B) and is not limited to tag pairs 135.

Referring to FIG. 12, the industrial truck 10 measures a travel distance from an identified primary tag 137. It should be understood that the travel distance is measured in both directions along an aisle path 70. As used throughout, the terms "forward"/"reverse" and "positive"/"negative" may be used interchangeably and are indicators of travel direction which are opposite directions to each other. The tag distance measurement L' is a travel distance measurement from an identified primary tag 137 towards the secondary tag 139. Referring now to FIG. 11 in addition to FIG. 12, in one embodiment, the reader module 35 (FIG. 1B) may not generate a missing tag signal when the travel distance measurement exceeds a tag threshold. Specifically, if the industrial vehicle 10 reverses direction after identifying the primary tag 137, the reader module may not generate a missing tag signal if a pre-tag distance threshold L" is exceeded by the tag distance measurement. The reader module 35 will check to make sure that the vehicle functionality and/or the tag-dependent positional data is correct in the cache memory 209 (FIG. 4). If the cache memory 209 is correct, the reader module 35 will wait until a primary tag 137 is identified. If the cache memory 209 is not correct, a missing tag signal is generated and a fault condition occurs as described hereinafter. The reader module also will not generate a missing tag signal if a post-tag distance threshold L'" is exceeded by the tag distance measurement. In this example, the post-distance threshold L" is measured from an identified secondary tag 139.

Referring to FIG. 6, the sequence list is a known order of one or more memory locations 200 corresponding to the succession of the plurality of sequenced tags 130 (FIG. 10) along the aisle path 70. In one embodiment, the industrial vehicle 10 (FIG. 1A) derives its travel direction along respective aisle paths 70 from the sequence of identified sequenced tags 130 and generates a travel direction signal indicative of the direction of travel of the industrial vehicle 10 along respective aisle paths 70. The individual tags of the tag layout 50 may have their tag position coordinates listed in the tag position data in reader memory 205. For example, and not by limitation, the tag position coordinates may be Cartesian coordinates with an origin positioned within the building 95 (FIG. 2). The industrial truck uses the tag position data to locate itself and derive its direction of travel based on whether the succession of identified tag position coordinates is increasing, decreasing, or combinations thereof. In other words, the sequence of identified sequenced tags 130 and their corresponding tag position data may be used to derive a travel direction of the industrial truck 10. It should also be understood that tag position data in reader memory 205 is not the same as tag-dependent positional data derived from identified tags. In one embodiment, the industrial vehicle 10 may derive its position from tag position data correlated with an identified individual tag of the tag layout 50.

Figure 13:
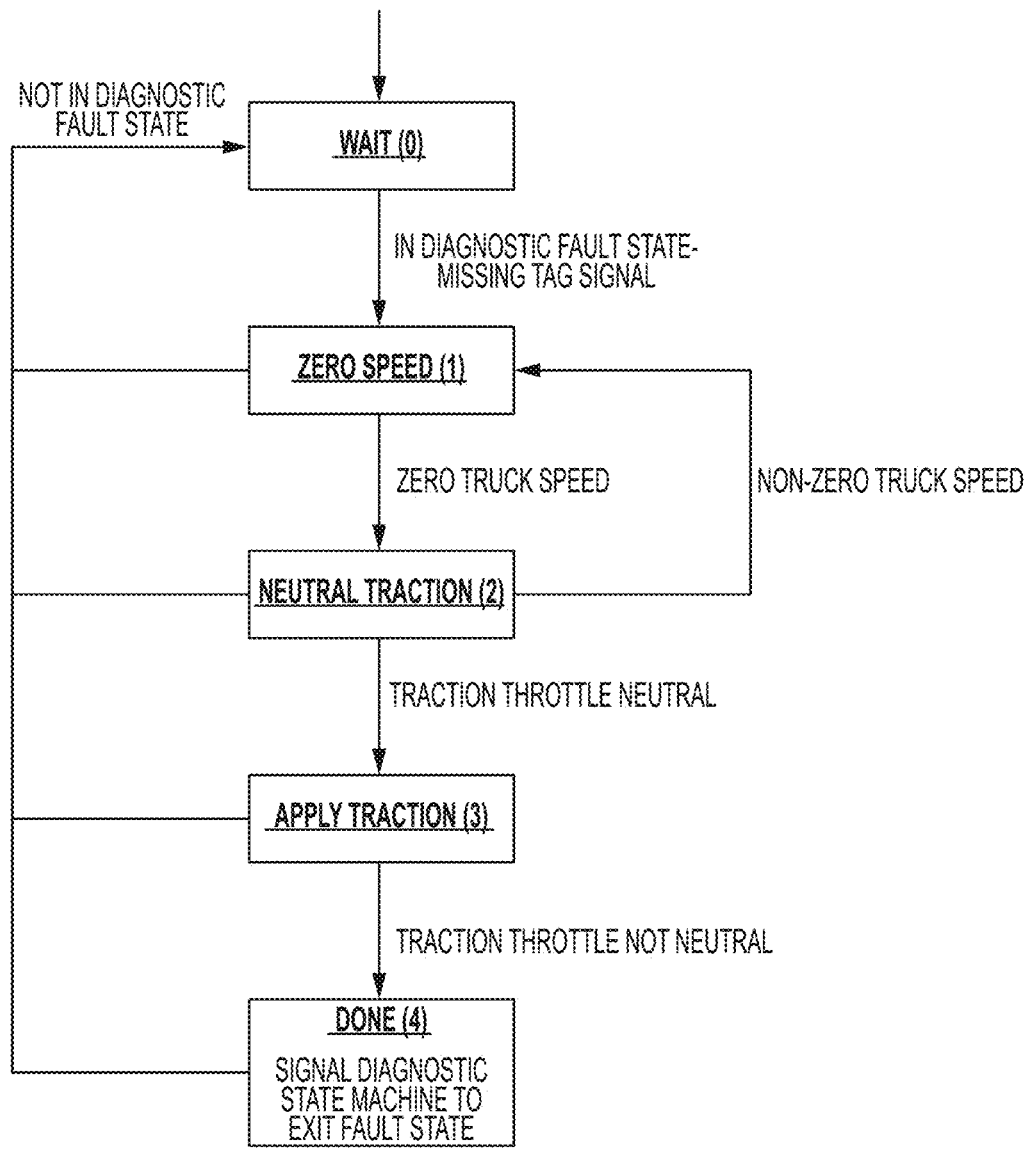
FIG. 13 is a diagnostic flowchart according to another embodiment of the present disclosure.

Referring to FIG. 13, it is contemplated that a fault state in the tag layout 50 (FIGS. 2 and 3) is indicated when a missing tag signal is generated. When the missing tag signal is generated, the vehicle controller 40 (FIG. 1B) may reduce a traveling speed of the vehicle drive mechanism 25 (FIG. 1A) to zero. In other words, it is contemplated that when a missing tag signal is generated, the vehicle controller 40 will bring the industrial vehicle 10 to a stop. The vehicle controller 40 may transition the vehicle drive mechanism 25 to neutral after bringing the industrial vehicle 10 to a stop. To clear the fault state, it may require a user, using the user interface, to transition the vehicle drive mechanism 25 from neutral. For example, and not by limitation, the user of the industrial vehicle 10 may need to manually control the industrial vehicle 10. In one embodiment, the user will manually control the industrial vehicle 10 until an individual tag of the tag layout 50 is identified.

Referring now to FIGS. 3 and 11 the vehicle controller 40 may send malfunction information to the remote computer 250 when a missing tag signal is generated. The malfunction information may comprise tag position data corresponding to a location of the malfunctioning sequence tag 130 in the tag layout 50. In one embodiment, the remote computer 250 indicates that a sequenced tag 130 is malfunctioning and provides the tag position data on a map indicative of the position of the sequenced tag 130 that is malfunctioning in the tag layout 50. In another embodiment, the vehicle controller 40 sends malfunction information to the display device 37 when a missing tag signal is generated. In one embodiment, the remote computer 250 generates an email to a service technician with a notification of the malfunctioning sequenced tag in the tag layout.

It is noted that recitations herein of "at least one" component, element, etc., or "one or more" component, element, etc., should not be used to create an inference that the alternative use of the articles "a" or "an" should be limited to a single component, element, etc.

It is noted that recitations herein of a component of the present disclosure being configured in a particular way or to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the terms "substantially," "about," and "approximately" are utilized herein to represent the inherent degree of uncertainty that may be attributed to any quantitative comparison, value, measurement, or other representation. The terms "substantially," "about," and "approximately" are also utilized herein to represent the degree by which a quantitative representation may vary from a stated reference without resulting in a change in the basic function of the subject matter at issue. For example, the distance between the tag reader and the travel plane may vary depending on the industrial vehicle design and the amount of power used by the tag reader to interrogate the individual tags.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the terms "wherein" or "by" as a transitional phrase. For the purposes of defining the present invention, it is noted that these terms are introduced in the claims as open-ended transitional phrases to be interpreted in like manner as the more commonly used open-ended transitional term "comprising."

What is claimed is:

1. A system for generating a travel direction signal indicative of a direction of travel of an industrial vehicle, the system comprising a tag layout and an industrial vehicle, wherein:
    the industrial vehicle comprises storage and retrieval hardware, a tag reader, a reader module, and a vehicle controller;
    the storage and retrieval hardware is configured to store and retrieve items from selected storage elements positioned along an aisle path;
    the tag layout comprises a plurality of individual tags that are sequenced along the aisle path in accordance with a sequence list that is accessible to the reader module;
    the tag reader and the reader module cooperate to identify the individual tags of the tag layout;
    the tag reader and the reader module further cooperate to generate a travel direction signal by identifying a succession of tags that are sequenced along the aisle path;
    the reader module (i) compares a succession of identified sequenced tags with at least a portion of the accessible sequence list, (ii) derives a travel direction of the industrial vehicle along respective aisle paths from the succession of identified sequenced tags, and (iii) generates a travel direction signal indicative of the industrial vehicle along respective aisle paths; and
    the vehicle controller controls operational functions of the storage and retrieval hardware within threshold boundaries determined partially as a function of the travel direction signal generated from the identified succession of tags sequenced along the aisle path.

2. The system as claimed in claim 1 wherein:
    the system further comprises a remote computer;
    the remote computer comprises computer memory storing load location data and is communicatively coupled to the vehicle controller;
    the vehicle controller controls operational functions of the storage and retrieval hardware partially in response to vehicle functionality that is correlated with load location data stored in the computer memory of the remote computer.

3. The system as claimed in claim 2 wherein the remote computer comprises a warehouse management system.

4. The system as claimed in claim 3 wherein:
    the system further comprises a warehouse; and
    the remote computer, the tag layout, and the industrial vehicle are located in the warehouse.

5. The system as claimed in claim 1 wherein the reader module reads memory locations corresponding to unique identification codes corresponding to individual tags sequenced along the aisle path in order of their identification codes or in reverse order of their identification codes, depending upon the travel direction signal.

6. The system as claimed in claim 1 wherein:
    the reader module comprises a reader memory; and
    the reader module reads memory locations in the reader memory in an order that depends upon the travel direction signal.

7. The system as claimed in claim 1 wherein:
    the tag layout comprises at least one succession of individual tags spaced uniformly to define a tag spacing s';
    the succession of individual tags is interrupted by at least one tag pair comprising a primary tag and a secondary tag;
    the primary tag and the secondary tag of each tag pair define a tag spacing s''; and
    the tag spacing s' is greater than the tag spacing s''.

8. The system as claimed in claim 1 wherein:
    the system further comprises a remote computer;
    the remote computer comprises computer memory storing load location data and is communicatively coupled to the vehicle controller;
    the vehicle controller controls operational functions of the storage and retrieval hardware partially in response to vehicle functionality that is correlated with load location data stored in the computer memory of the remote computer; and
    the reader module reads memory locations corresponding to unique identification codes corresponding to individual tags sequenced along the aisle path in order of their identification codes or in reverse order of their identification codes, depending upon the travel direction signal.

9. The system as claimed in claim 1 wherein:
    the system further comprises a remote computer and a warehouse;
    the remote computer comprises computer memory storing load location data and is communicatively coupled to the vehicle controller;
    the vehicle controller controls operational functions of the storage and retrieval hardware partially in response to vehicle functionality that is correlated with load location data stored in the computer memory of the remote computer;
    the remote computer comprises a warehouse management system;
    the remote computer, the tag layout, and the industrial vehicle are located in the warehouse; and
    the reader module reads memory locations corresponding to unique identification codes corresponding to individual tags sequenced along the aisle path in order of their identification codes or in reverse order of their identification codes, depending upon the travel direction signal.

10. The system as claimed in claim 1 wherein:
    the system further comprises a remote computer;
    the remote computer comprises computer memory storing load location data and is communicatively coupled to the vehicle controller;
    the vehicle controller controls operational functions of the storage and retrieval hardware partially in response to vehicle functionality that is correlated with load location data stored in the computer memory of the remote computer;
    the reader module comprises a reader memory; and
    the reader module reads memory locations in the reader memory in an order that depends upon the travel direction signal.

11. The system as claimed in claim 1 wherein:
    the system further comprises a remote computer and a warehouse;
    the remote computer comprises computer memory storing load location data and is communicatively coupled to the vehicle controller;
    the vehicle controller controls operational functions of the storage and retrieval hardware partially in response to vehicle functionality that is correlated with load location data stored in the computer memory of the remote computer;
    the remote computer comprises a warehouse management system;
    the remote computer, the tag layout, and the industrial vehicle are located in the warehouse;

the reader module comprises a reader memory; and the reader module reads memory locations in the reader memory in an order that depends upon the travel direction signal.

12. The system as claimed in claim 1 wherein:

the system further comprises a remote computer;

the remote computer comprises computer memory storing load location data and is communicatively coupled to the vehicle controller;

the vehicle controller controls operational functions of the storage and retrieval hardware partially in response to vehicle functionality that is correlated with load location data stored in the computer memory of the remote computer;

the tag layout comprises at least one succession of individual tags spaced uniformly to define a tag spacing s';

the succession of individual tags is interrupted by at least one tag pair comprising a primary tag and a secondary tag;

the primary tag and the secondary tag of each tag pair define a tag spacing s"; and the tag spacing s' is greater than the tag spacing s".

13. The system as claimed in claim 1 wherein:

the system further comprises a remote computer;

the remote computer comprises computer memory storing load location data and is communicatively coupled to the vehicle controller;

the vehicle controller controls operational functions of the storage and retrieval hardware partially in response to vehicle functionality that is correlated with load location data stored in the computer memory of the remote computer;

the reader module reads memory locations corresponding to unique identification codes corresponding to individual tags sequenced along the aisle path in order of their identification codes or in reverse order of their identification codes, depending upon the travel direction signal;

the tag layout comprises at least one succession of individual tags spaced uniformly to define a tag spacing s';

the succession of individual tags is interrupted by at least one tag pair comprising a primary tag and a secondary tag;

the primary tag and the secondary tag of each tag pair define a tag spacing s"; and the tag spacing s' is greater than the tag spacing s".

* * * * *